United States Patent
Nair et al.

(10) Patent No.: US 11,954,099 B2
(45) Date of Patent: Apr. 9, 2024

(54) SYSTEMS, METHODS, AND PROGRAM PRODUCTS FOR PROVIDING INVESTMENT EXPERTISE USING A FINANCIAL ONTOLOGY FRAMEWORK

(71) Applicant: Magnifi LLC, Boulder, CO (US)

(72) Inventors: Vinay Nair, Boulder, CO (US); Aniket Vijaykumar Jain, Boulder, CO (US)

(73) Assignee: Magnifi LLC, Boulder, CO (US)

(*) Notice: Subject to any disclaimer, the term of this patent is extended or adjusted under 35 U.S.C. 154(b) by 65 days.

(21) Appl. No.: 17/520,336

(22) Filed: Nov. 5, 2021

(65) Prior Publication Data

US 2022/0147515 A1    May 12, 2022

Related U.S. Application Data

(60) Provisional application No. 63/198,751, filed on Nov. 10, 2020.

(51) Int. Cl.
*G06F 16/242*    (2019.01)
*G06F 16/2455*   (2019.01)
*G06F 16/248*    (2019.01)
*G06F 16/26*     (2019.01)

(52) U.S. Cl.
CPC ........ *G06F 16/243* (2019.01); *G06F 16/2456* (2019.01); *G06F 16/24564* (2019.01); *G06F 16/248* (2019.01); *G06F 16/26* (2019.01)

(58) Field of Classification Search
None
See application file for complete search history.

(56) References Cited

U.S. PATENT DOCUMENTS

| | | | |
|---|---|---|---|
| 7,747,601 B2* | 6/2010 | Cooper | G06N 20/00 707/708 |
| 11,334,565 B1* | 5/2022 | Cheng | G06F 16/24522 |
| 2013/0268260 A1* | 10/2013 | Lundberg | G06F 11/3664 704/8 |
| 2014/0317017 A1 | 10/2014 | Torre et al. | |
| 2016/0239918 A1 | 8/2016 | Lambur et al. | |
| 2017/0076226 A1* | 3/2017 | Allen | G06F 16/36 |
| 2017/0278181 A1 | 9/2017 | Shah | |
| 2017/0293677 A1* | 10/2017 | Boguraev | G06F 16/24578 |
| 2018/0329948 A1* | 11/2018 | Nijor | G06F 16/243 |
| 2020/0310888 A1 | 10/2020 | Gopalan et al. | |
| 2020/0311815 A1 | 10/2020 | Herz et al. | |
| 2022/0277005 A1* | 9/2022 | Gao | G06F 16/243 |

OTHER PUBLICATIONS

International Search Report Issued in PCT Application No. PCT/US2021/058405, dated Feb. 1, 2022.

* cited by examiner

*Primary Examiner* — Dawaune A Conyers
(74) *Attorney, Agent, or Firm* — Amster, Rothstein & Ebenstein LLP

(57) ABSTRACT

Systems and methods for implementing a multi-factor financial ontology framework are disclosed. In exemplary embodiments, a computer-implement method executing on a computer receives a natural language query from a user device and parses the query to determine a set of natural language terms associated with financial product criteria. The computer system maps the natural language terms to data nodes that implement the financial ontology framework and identifies responsive financial products from those data nodes. The computer system transmits the data corresponding to the responsive financial product to the user device.

17 Claims, 18 Drawing Sheets

FIG. 3A

Portfolio tools: (Discovery) (Selector) (Builder) (Enhancer) (Client Portal) (PC)

Here are the relevant results for funds that do well when markets fall

| Add to | Name | | Fees | Return | Risk | Exposure to SPY | View ∨ | | | | |
|---|---|---|---|---|---|---|---|---|---|---|---|
| | ▽ Velocity | | | | | | Max 10 5 3 1 | | | | |
| | | | | | | | Nov 2017 – Oct 2020 year year year year | | | | |
| ⊙ | TVIXF $64.3 ETN | Daily 2x VIX Short-Term Others | 1.65% High | -10.42% Low | 149.64% High | -4.3 -2.1 | $100 ━━━━━━ $6 | | | | |
| ⊙ | UFPIX $34.1 MF | ⊕ PROFUNDS UltraShort Latin America – Inv class Inverse Equity Market | 1.78% High | 12.53% High | 58.09% High | -4.3 -2.6 -2.1 | $100 ━━━━━━ $91 | | | | |
| ⊙ | BMKD $11.6 ETN | MicroSectors™ MicroSectors U.S. Big Banks Index... Inverse Financials Equity | 0.95% Average | -53.31% Low | 73.64% High | -4.3 -4.2 -2.1 | $100 ━━━━━━ $29 | | | | |
| ⊙ | HIBS $5.3 ETF | Direxion Daily S&P 500 High Beta Bear 3X... Inverse Large-Cap US Equity | 1.07% Average | -85.00% Low | 78.40% High | -4.3 -4.0 -2.1 | $100 ━━━━━━ $29 | | | | |
| ⊙ | RYIUX $25.9 MF | GUGGENHEIM Inverse Russell 2000 2x Strategy... Inverse US Equity | 1.86% High | -15.50% Low | 41.51% Average | -4.3 -2.3 -2.1 | $100 ━━━━━━ $43 | | | | |
| ⊙ | SOXS $40.1 ETF | Direxion Daily Semiconductor... Inverse Semiconductors Equity | 1.08% Average | -109.83% Low | 76.23% Average | -4.3 -3.8 -2.1 | $100 ━━━━━━ $1 | | | | |
| ⊙ | NRGD $32.4 ETN | MicroSectors™ MicroSectors U.S. Big Oil Index – 3X... Inverse US Oil & Gas Equity | 0.95% Average | 91.33% Average | 130.74% Average | -4.3 -3.7 -2.1 | $100 ━━━━━━ $74 | | | | |
| ⊙ | UWPIX $9.1 MF | ⊕ PROFUNDS UltraShort Dow 30 – Inv Class Inverse Equity Market | 1.78% High | -25.93% Low | 30.45% Average | -4.3 -2.1 -2.1 | $100 ━━━━━━ $39 | | | | |
| ⊙ | BZQ $17.8 ETF | ProShares UltraShort MSCI Brazil Capped Inverse Brazil Equity | 0.95% Average | 0.39% Average | 73.70% Average | -4.3 -3.5 -2.1 | $100 ━━━━━━ $48 | | | | |

Funds that do well when ×Q

◯◯ ETF ⊙  ◯◯ SMA ⊙
◯◯ Models ⊙  ◯◯ MF ⊙
◯◯ CEF ⊙

Share
Download
Trending searches
(click on any to see results)

Funds that do
VIX
Outperform SPY
Biotech

Related Searches
low cost funds that do well when mar...
low risk funds that do well when mar...
high return funds that do well when...

Popular Themes
Big Data
Stemcell

FIG. 3B

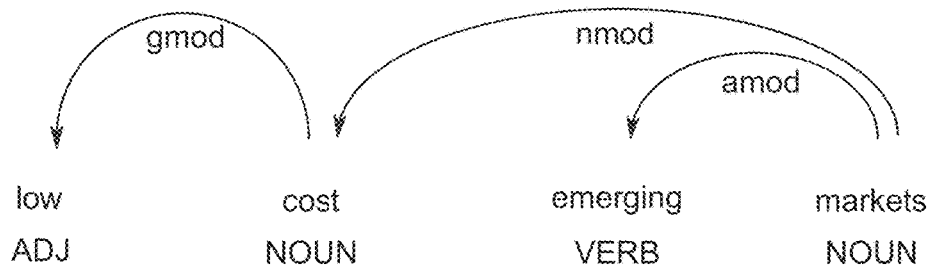

| Query/input text | Semantic properties | Financial interpretation |
|---|---|---|
| Low | lemma: low<br>head: cost<br>pos: adj<br>dep: amod<br>left edge: low<br>right edge: low<br>is digit: FALSE<br>is punct: FALSE | node: low<br><br>parent: preference<br><br>- or -<br><br>node: low<br><br>parent: stock ticker |
| Cost | lemma: low<br>head: emerging markets<br>pos: NOUN<br>dep: compound<br>left edge: low<br>right edge: cost<br>is digit: FALSE<br>is punct: FALSE | node: lowcost<br><br>parent: attribute<br><br>- or -<br><br>node: cost<br><br>parent: stock ticker |
| Emerging markets | lemma: emerging markets<br>head: emerging markets<br>pos: NOUN<br>dep: ROOT<br>left edge: low<br>right edge: emerging markets<br>is digit: FALSE<br>is punct: FALSE | node: emerging markets<br><br>parent: exposure/region |

FIG. 4A

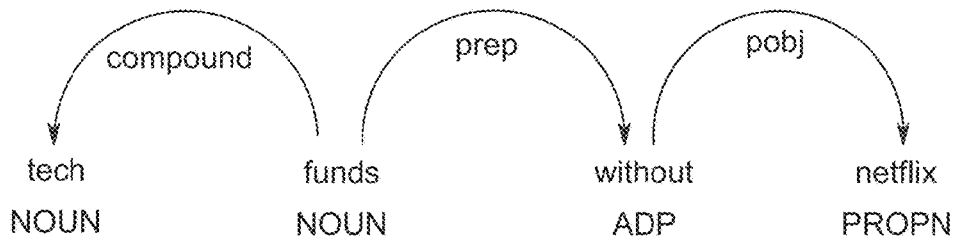

| Query/input text | Semantic properties | Financial interpretation |
|---|---|---|
| tech | lemma: tech<br>head: funds<br>pos: NOUN<br>dep: compound<br>left edge: tech<br>right edge: tech<br>is digit: FALSE<br>is punct: FALSE | node: tech<br>parent: exposure/theme<br>- or -<br>node: information technology<br>parent: exposure/sector |
| funds | lemma: funds<br>head: funds<br>pos: NOUN<br>dep: ROOT<br>left edge: tech<br>right edge: netflix<br>is digit: FALSE<br>is punct: FALSE | node: funds<br>parent: vehicle |
| without | lemma: without<br>head: funds<br>pos: ADP<br>dep: prep<br>left edge: without<br>right edge: netflix<br>is digit: FALSE<br>is punct: FALSE | node: without<br>parent: negation |
| netflix | lemma: netflix<br>head: without<br>pos: PROPN<br>dep: pobj<br>left edge: netflix<br>right edge: netflix<br>is digit: FALSE<br>is punct: FALSE | node: netflix<br>parent: company name<br>- or -<br>node: movie<br>parent: exposure/theme/entertainment |

FIG. 4B

ETF table

| ETF | Price | Fee | Attr... | EM | Region... | Tech | Theme... | ... | ... |
|-----|-------|-----|---------|-----|-----------|------|----------|-----|-----|
| ETF 1 | $X | X% | ⋮ | X% | ⋮ | X% | ⋮ | ⋮ | ⋮ |
| ETF 2 | $X | X% | ⋮ | X% | ⋮ | X% | ⋮ | ⋮ | ⋮ |
| ETF... | ⋮ | ⋮ | ⋮ | ⋮ | ⋮ | ⋮ | ⋮ | ⋮ | ⋮ |

Mutual fund table

| MF | Price | Fee | Attr... | EM | Region... | Tech | Theme... | ... | ... |
|----|-------|-----|---------|-----|-----------|------|----------|-----|-----|
| MF 1 | $X | X% | ⋮ | X% | ⋮ | X% | ⋮ | ⋮ | ⋮ |
| MF 2 | $X | X% | ⋮ | X% | ⋮ | X% | ⋮ | ⋮ | ⋮ |
| MF... | ⋮ | ⋮ | ⋮ | ⋮ | ⋮ | ⋮ | ⋮ | ⋮ | ⋮ |

FIG. 7
(PRIOR ART)

SYSTEMS, METHODS, AND PROGRAM PRODUCTS FOR PROVIDING INVESTMENT EXPERTISE USING A FINANCIAL ONTOLOGY FRAMEWORK

CROSS REFERENCE TO RELATED APPLICATIONS

This is a non-provisional application which claims priority to and the benefit of U.S. Provisional Patent Application No. 63/198,751, filed Nov. 10, 2020 and entitled SYSTEMS, METHODS, AND PROGRAM PRODUCTS FOR PROVIDING INVESTMENT EXPERTISE USING A FINANCIAL ONTOLOGY FRAMEWORK, the contents of which are incorporated herein by reference in their entirety.

FIELD

The present invention generally relates to computer systems and computer-implemented methods for receiving and processing natural language queries for financial information from end user devices and, in response, providing relevant financial information to those devices for display thereon using a financial ontology framework.

BACKGROUND

The world of investing is complex. Individual investors, institutional investors, financial advisors, and portfolio managers are confronted daily with a virtually unlimited array of information that could drive investment decisions. This information is often contained in prospectuses, government filings, historical stock and bond price performance, mutual fund performance, and exchange traded fund performance. Indeed, investors are often unaware of what investments are even available in the market, let alone the information that is needed to analyze whether those investments make sense.

Current investment advisory systems and platforms attempt to alleviate some of the complexity by making available to end users raw investment data, which the end user needs to consume and analyze in order to decide which investments meet his or her goals. For example, there exist platforms that store a great amount of financial data relating to potential products that an investor may want to invest in. These platforms, however, suffer from several technological disadvantages.

First, many platforms do not support natural language interaction with end users. Often, the platforms provide an interface to an end user that is rigidly structured and does not allow a potential investor flexibility in inquiring what investments might be right for his or her needs.

Further, platforms that do support some form of natural language interaction tend to perform poorly, producing less relevant results, and with high latency from the initial query transmitted by an end user to the provision of results that are responsive to that query. One reason for this poor performance is that current systems tend to store all financial information that the systems provide in a few very large and cumbersome databases and tables. These large databases and tables are difficult to administer and are time consuming to query. And, since there are relatively few large tables that provide data in response to user queries, there is a great amount of contention between users to access these tables, which results in delays. This technological problem follows as a result of current natural language platforms in the area of financial services do not utilize a financial ontology framework, as disclosed herein.

Conventional financial product computer platforms most commonly use a brute-force approach to respond to queries by searching through static and cumbersome databases that store a very large amount of data pertaining to financial products and a cascade of related information associated with each product. This results in a large burden on available computer processing and ultimately delays production of relevant search results.

Systems and methods disclosed herein provide an alternative technological solution that provides end users with the ability to request financial information using natural language, and to receive targeted responsive information quickly and efficiently while minimizing computer processing burden and allowing associated computer platforms to operate more efficiently.

SUMMARY

The present invention addresses technological problems by providing new and improved computer systems and methods for receiving natural language queries and providing relevant investment data and advice in response using a multi-factor financial ontology framework.

In this regard, an object of the present invention is to provide a computer platform that organizes data along an ontological framework so as to offer a technological solution to the technological problems of conventional financial database query systems. In embodiments, rather than using a relatively small number of large and heavily accessed tables, a financial ontology framework provides for the direct and quick access of relevant financial data in response to natural language queries. Such a system provides small datasets (or "nodes" as described herein), which store financial data along the lines of the ontological framework and avoid the problems inherent with systems that try to be "all things to all investors."

Systems and methods in accordance with some exemplary embodiments of the present invention utilize a computer system that is in operative communication with one or more user devices from which the computer system receives natural language queries of a financial nature. The computer system parses those queries into terms that correspond to a multi-factor financial ontology framework, identifies and retrieves relevant financial data from the financial ontology framework that is responsive to the natural language query, and provides this data to the user devices in a format that the user devices can display. By using a multi-factor ontology involving targeted search of a set number of nodes in accordance with exemplary embodiments of the present invention, computer systems are able to operate more efficiently in providing accurate search results pulled from a large amount of available data.

In accordance with exemplary embodiments, a computer-implemented method of processing a natural language query using a computer system that implements a multi-factor financial ontology framework comprises the steps of: receiving, at a computer system comprising one or more computers, from a user device, a natural language query; parsing, by the computer system, the natural language query to determine a set of natural language terms within the query associated with a set of financial product criteria; mapping, by the computer system, the determined set of natural language terms to a set of one or more first data items, wherein each first data item is associated with one of a plurality of data categories, where each data category is associated with a corresponding one of a plurality of financial product factors, the plurality of financial product factors comprising strategy, preference, attribute, exposure, asset type, sponsor, vehicle, legal structure, objective and listing country; identifying, by the computer system, one or more financial products that satisfy the set of financial product criteria, the step of identifying comprising: retrieving, by the computer system, from a plurality of data nodes each associated with one or more data items, wherein each data item is associated with one of the plurality of data categories, a first data node containing a first set of data items that correspond to the set of one or more first data items; and identifying, by the computer system, one or more financial products within the first data node; ranking, by the computer system, the identified one or more financial products based on a set of rules; and sending, by the computer system, in response to the natural language query, the identified financial products for display at the user device as ranked in accordance with the set of rules.

In accordance with exemplary embodiments, a computer system comprising one or more processors and a memory implements a multi-factor financial ontology framework, wherein the one or more processors are programmed to execute instructions to carry out a computer-implemented method of processing a natural language query, the method comprising the steps of: receiving, at the computer system from a user device, a natural language query; parsing, by the computer system, the natural language query to determine a set of natural language terms within the query associated with a set of financial product criteria; mapping, by the computer system, the determined set of natural language terms to a set of one or more first data items, wherein each first data item is associated with one of a plurality of data categories, where each data category is associated with a corresponding one of a plurality of financial product factors, the plurality of financial product factors comprising strategy, preference, attribute, exposure, asset type, sponsor, vehicle, legal structure, objective and listing country; identifying, by the computer system, one or more financial products that satisfy the set of financial product criteria, the step of identifying comprising: retrieving, by the computer system, from a plurality of data nodes each associated with one or more data items, wherein each data item is associated with one of the plurality of data categories, a first data node containing a first set of data items that correspond to the set of one or more first data items; and identifying, by the computer system, one or more financial products within the first data node; ranking, by the computer system, the identified one or more financial products based on a set of rules; and sending, by the computer system, in response to the natural language query, the identified financial products for display at the user device as ranked in accordance with the set of rules.

In accordance with exemplary embodiments, a non-transitory computer-readable medium stores computer-executable instructions that, when executed by a computer system implementing a multi-factor financial ontology framework, causes the computer system to carry out a computer-implemented method of processing a natural language query, the method comprising the steps of: receiving, at the computer system from a user device, a natural language query; parsing, by the computer system, the natural language query to determine a set of natural language terms within the query associated with a set of financial product criteria; mapping, by the computer system, the determined set of natural language terms to a set of one or more first data items, wherein each first data item is associated with one of a plurality of data categories, where each data category is associated with a corresponding one of a plurality of financial product factors, the plurality of financial product factors comprising strategy, preference, attribute, exposure, asset type, sponsor, vehicle, legal structure, objective and listing country; identifying, by the computer system, one or more financial products that satisfy the set of financial product criteria, the step of identifying comprising: retrieving, by the computer system, from a plurality of data nodes each associated with one or more data items, wherein each data item is associated with one of the plurality of data categories, a first data node containing a first set of data items that correspond to the set of one or more first data items; and identifying, by the computer system, one or more financial products within the first data node; ranking, by the computer system, the identified one or more financial products based on a set of rules; and sending, by the computer system, in response to the natural language query, the identified financial products for display at the user device as ranked in accordance with the set of rules.

In accordance with exemplary embodiments, the parsing step of the computer-implemented method of processing a natural language query using a computer system that implements a multi-factor financial ontology framework comprises: assigning each natural language term within the query a part of speech; assigning each natural language term within the query a relationship within a sentence that makes up the query; and assigning each natural language term a financial context based on the financial product factors and the part of speech.

In accordance with exemplary embodiments, the mapping step of the computer-implemented method of processing a natural language query using a computer system that implements a multi-factor financial ontology framework comprises matching directly each natural language term within the query to one of the plurality of data categories and one of the one or more first data items.

In accordance with exemplary embodiments, the mapping step of the computer-implemented method of processing a natural language query using a computer system that implements a multi-factor financial ontology framework comprises matching indirectly each natural language term within the query to one of the plurality of data categories and one of the one or more first data items.

In accordance with exemplary embodiments, the mapping step of the computer-implemented method of processing a natural language query using a computer system that implements a multi-factor financial ontology framework comprises: determining a synonym of a natural language term within the query; and matching directly or indirectly the synonym to one of the plurality of data categories and one of the one or more first data items.

In accordance with exemplary embodiments, the mapping step of the computer-implemented method of processing a natural language query using a computer system that implements a multi-factor financial ontology framework comprises: identifying a natural language term within the query that does not match with any of the one or more first data items; and establishing a new data item associated with one of the plurality of data categories based on the identified natural language term.

In accordance with exemplary embodiments, the identifying step of the computer-implemented method of processing a natural language query using a computer system that implements a multi-factor financial ontology framework comprises deriving, by the computer system, a Structured Query Language (SQL) query to call the plurality of data nodes.

In accordance with exemplary embodiments, the identifying step of the computer-implemented method of processing a natural language query using a computer system that implements a multi-factor financial ontology framework further comprises: retrieving, by the computer system, from the plurality of data nodes a second data node containing a second set of data items that correspond to the set of one or more first data items, wherein the SQL query derived by the computer system joins the first data node with the second data node; and identifying, by the computer system, one or more financial products within the joined first and second data nodes.

In accordance with exemplary embodiments, the identifying step of the computer-implemented method of processing a natural language query using a computer system that implements a multi-factor financial ontology framework further comprises making an Application Programming Interface (API) call to read in the plurality of data nodes.

In accordance with exemplary embodiments, the ranking step of the computer-implemented method of processing a natural language query using a computer system that implements a multi-factor financial ontology framework is performed based on one or more preferences identified in the natural language query.

In accordance with exemplary embodiments, the ranking step of the computer-implemented method of processing a natural language query using a computer system that implements a multi-factor financial ontology framework is performed based on one or more data definitions each associated with one of the plurality of data nodes.

In accordance with exemplary embodiments, the one or more user devices in operative communication with the computer system that implements a multi-factor financial ontology framework executes a web browser that communicates with the computer system over the internet.

In accordance with exemplary embodiments, at least one of the one or more user devices in operative communication with the computer system that implements a multi-factor financial ontology framework is a mobile device.

In accordance with exemplary embodiments, the sending step of the computer-implemented method of processing a natural language query using a computer system that implements a multi-factor financial ontology framework comprises generating a graphical user interface that displays the identified one or more financial products based on the set of rules.

In accordance with exemplary embodiments, the computer system that implements a multi-factor financial ontology framework receives a natural language query from the internet.

In accordance with exemplary embodiments, the computer system that implements a multi-factor financial ontology framework receives a natural language query from a software application configured to run on a mobile device.

In accordance with exemplary embodiments, the computer system that implements a multi-factor financial ontology framework receives a natural language query at a Uniform Resource Locator (URL).

DESCRIPTION OF THE DRAWINGS

Exemplary embodiments of the present invention will be described with references to the accompanying figures, wherein:

FIGS. 3A, 3B, and 3C are block diagrams that illustrate mobile, tablet, and desktop user devices in accordance with exemplary embodiments of the present invention;

FIGS. 4A and 4B illustrate techniques for natural language parsing in accordance with exemplary embodiments of the present invention;

FIG. 7 illustrates exemplary prior art techniques for storing financial data;

DETAILED DESCRIPTION

The present invention generally relates to systems and methods for processing natural language queries using a financial ontology framework.

In embodiments, the present invention seeks to address the technological problem of providing relevant financial data and investment expertise quickly and with low latency in response to natural language queries. The present invention provides technological improvements over current natural language platforms in the financial services industry by organizing data responsive to natural language queries in a manner that improves the speed of providing that data to an end user, while, at the same time, increasing the relevance of the data to the end user's needs as expressed in the query.

In exemplary embodiments, the present invention addresses technological barriers to the provision of financial data with low latency by providing a technological solution in the form of a computer system and process that utilizes a multi-factor financial ontology framework that is structured in a manner to enable quick and efficient retrieval of such financial data.

Figure 1:
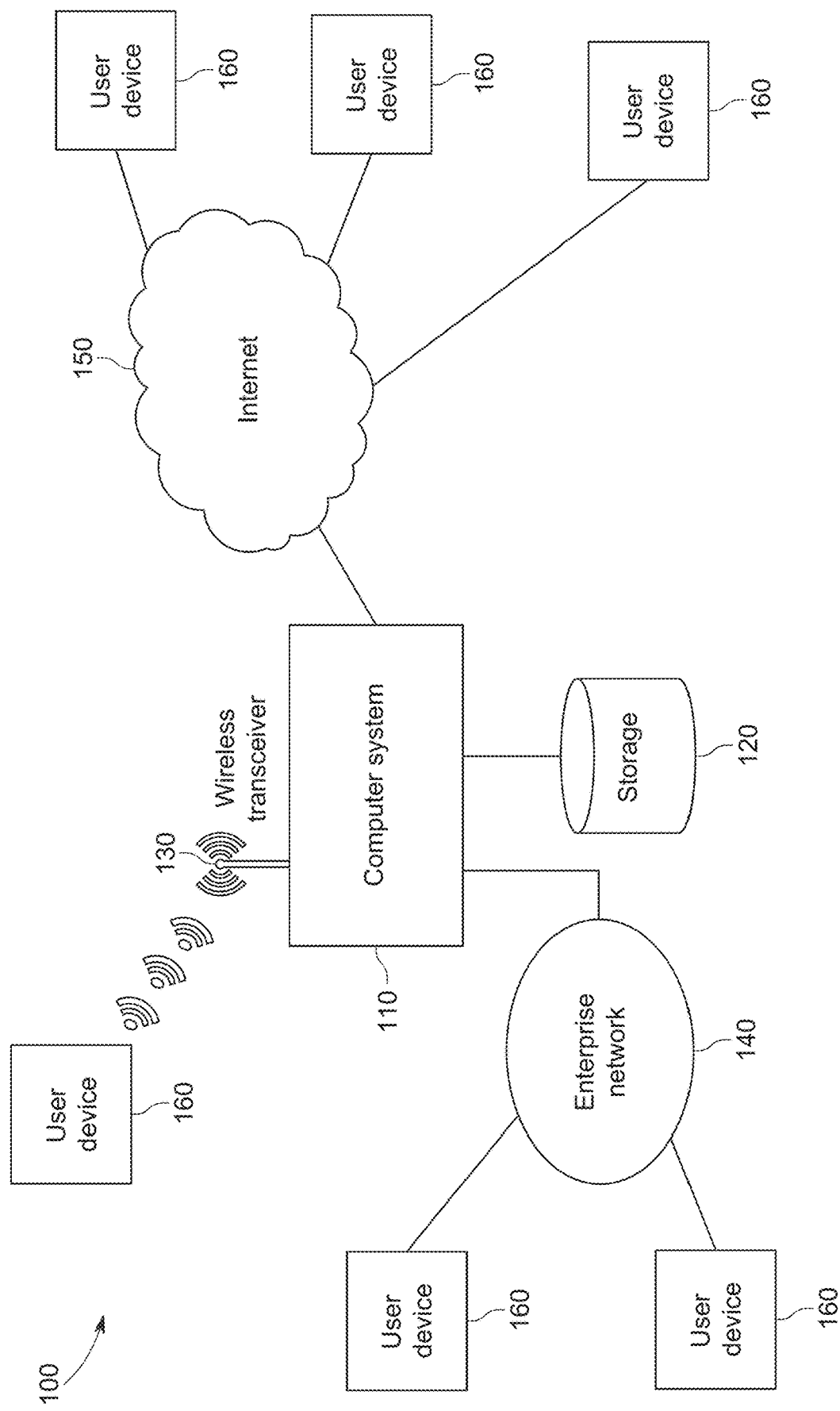
FIG. 1 is a block diagram that illustrates the relationship among a computer system, user devices, and networks in accordance with exemplary embodiments of the present invention.

FIG. 1 is a block diagram of a system, generally designated by reference number 100, which includes a computer system 110, user devices 160, a storage 120, an enterprise network 140, and an internet (or wide-area network) 150 in accordance with exemplary embodiments of the present invention. Computer system 110 may be a single or multi-processor desktop or server class computer. In some embodiments, computer system 110 may comprise several physical computing devices operatively connected to one another. In embodiments, computer system 110 may also be a laptop or notebook computer. As shown in FIG. 1, computer system 110 is operatively connected to storage 120 and performs network communication over local, enterprise, and wide area networks. In embodiments, computer system 110 may also be configured to communicate over a wireless network, such as, for example, a wireless local area network (LAN) that communicates in accordance with IEEE 802.11 (or "Wi-Fi"). By way of example, and not limitation, computer system 110 may also communicate over a radio-frequency (RF) network, a cellular data network, such as, for example 3G, 4G, and 5G networks, an infrared communication medium, or other wireless media. Various communication protocols may be used to facilitate communications between computer system 110 and user devices 160 over enterprise network 140 or internet 150 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS136/TDMA, iDen, LTE or any other suitable cellular network protocol), infrared, BitTorrent, FTP, RTP, RTSP, SSH, and/or VOIP. To support wireless data communication, computer system 110 may be operatively connected to wireless transceiver 130. In embodiments, wireless transceiver 130 may be support communication over WiFi, WiMax, cellular, or other wireless medium (and/or any other communication protocols mentioned above), and may be connected to enterprise network 140 or internet 150 via any combination of wired or wireless connections (e.g. any communication protocols mentioned above).

In embodiments, storage 120 may be, for example, a single hard disk drive (HDD), an array of HDDs, an optical storage device, or a flash memory device.

As shown in FIG. 1, system 100 also includes a plurality of user devices 160. Each user device 160 may be, in embodiments, a desktop computer or server class computer, a laptop computer, a notebook computer, a tablet computing device, a cellular telephone, a smartphone, or personal digital assistant. Each user device 160 can be enabled to perform network communication with computer system 110 over local, enterprise, and/or wide area networks, or over wireless LANs and/or cellular data networks. As shown in FIG. 1, user device 160 may communicate with computer system 110 wirelessly by transmitting data to and receiving data from wireless receiver 130. User device 160 may also operatively connect to and transmit and receive data over enterprise network 140 which, itself, is in operative communication with computer system 110. Furthermore, user device 160 may be operatively connected to a wide area network (WAN) such as, for example, internet 150. Computer system 110 may also connect to internet 150, thereby enabling communication between user devices 160 and computer system 110 over a WAN.

Figure 2:
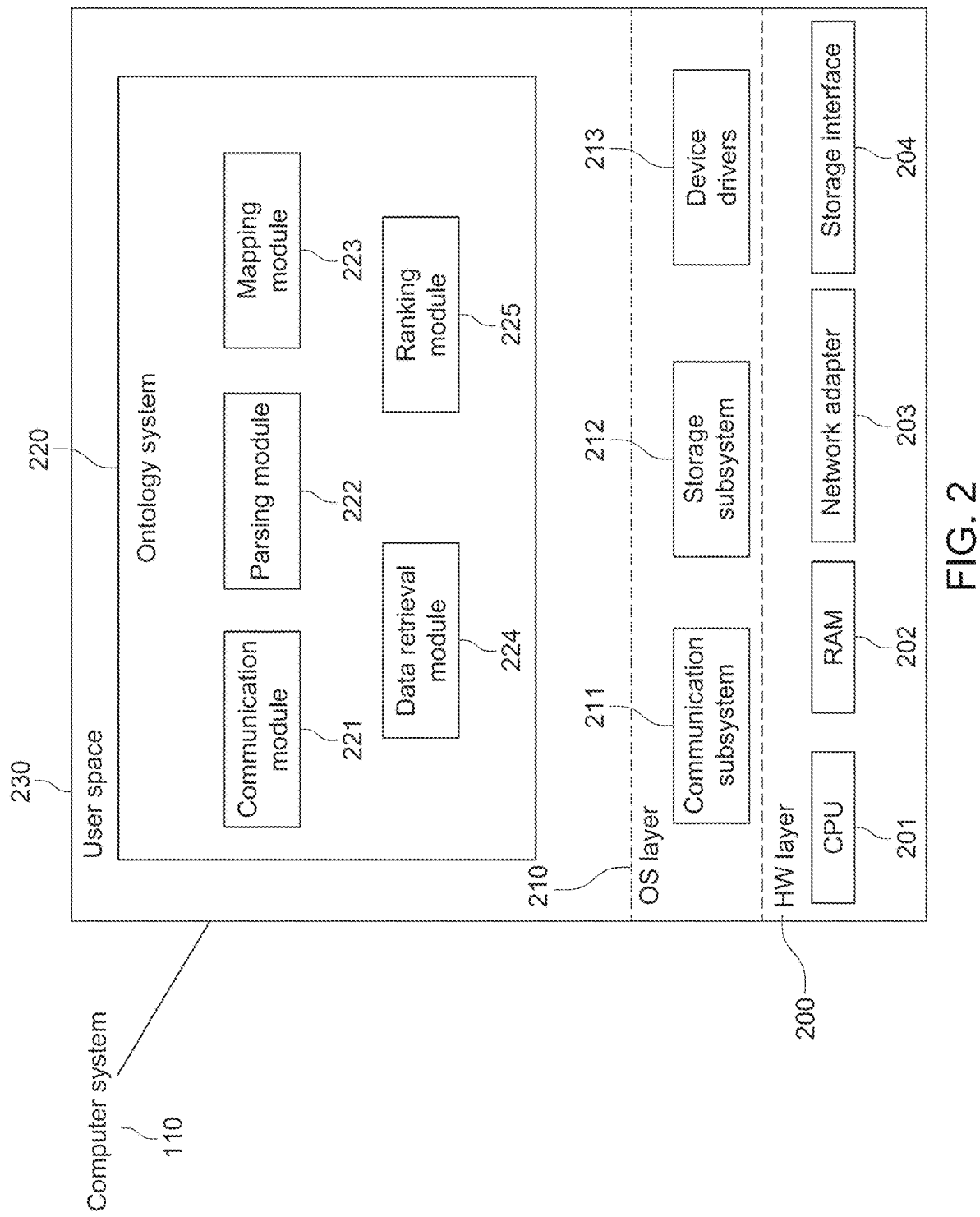
FIG. 2 is a block diagram that illustrates a computer system that implements a financial ontology framework in accordance with exemplary embodiments of the present invention.

FIG. 2 is a block diagram that depicts an embodiment of computer system 110. As shown, computer system 110 includes a hardware layer 200. Hardware layer 200 includes one or more central processing units (CPUs) 201, which execute instructions that implement the methods disclosed herein. Hardware layer 200 also includes random access memory (RAM) 202. In embodiments, RAM 202 may comprise volatile memory using dynamic RAM (DRAM) modules. RAM 202 may, in embodiments, also include non-volatile read-only memory (ROM). Hardware layer 200 also includes one or more network adapters 203, which enable computer system 110 to communicate over local, enterprise, wide-area, or wireless networks. In embodiments, network adapter 203 may support communication using multiple networking protocols such as, for example, TCP/IP, IPX/SPX, ISDN, and Ethernet. Further, hardware layer 200 may also include a storage interface 204, which interfaces with storage 120. In embodiments, storage interface 204 may be any of the disk drive interfaces known in the art such as, for example, ATA, IDE, SCSI, and/or Fibre Channel.

Referring back to FIG. 2, above hardware layer 200 is operating system 210. Operating system layer 210 is a software layer that manages the hardware and software resources of computer system 110 and provides services for application programs. According to embodiments, operating system layer 210 may run any of a number of server operating systems known in the art, such as, for example, Unix, Microsoft Windows, macOS, or Linux. As shown, operating system layer 210 includes modules and subsystems that manage the hardware resources of computer system 110. According to embodiments, operating system layer 210 includes a communication subsystem 211, which manages network communication between computer system 110 and external communication networks, such as enterprise network 140 and internet 150. In embodiments, communication subsystem 211 implements one or more network protocols such as, for example, TCP/IP, IPX/SPX, ISDN, and/or Ethernet.

As shown in FIG. 2, operating system layer 210 includes storage subsystem 212. According to embodiments, storage subsystem 210 includes software that provides an interface to external storage devices such as, for example, storage 120. In embodiments, storage subsystem 212 interfaces with a single storage device, such as a single HDD, or to multiple storage device, such as multiple disks configured in a storage area network (SAN). In addition, according to some embodiments, storage subsystem 212 can implement a RAID controller that provides robustness and data redundancy by combining multiple physical disk into one or more logical storage units.

Operating system layer 210 also includes one more device drivers 213, which are software programs that operate and control external devices that are coupled to computer system 110. In embodiments, device drivers 213 can include interfaces with external printers, video adapters, network adapters, and external storage devices. Device drivers 213 provide an interface for the operating system executing on computer system 110 (including communication subsystem 211 and storage subsystem 212) to interface with external devices.

FIG. 2 also depicts an exemplary user space 230 in accordance with exemplary embodiments of the present invention. In embodiments, user space 230 is a layer in which user programs and application execute under the control of the operating system that executes in operating system layer 210. As shown in the figure, one application that executes in user space 230 is ontology system 220. As shown, embodiments of ontology system 220 are divided into a plurality of modules. According to such embodiments, ontology system 220 includes communication module 221, parsing module 222, mapping module 223, data retrieval module 224, and ranking module 225, to name a few.

Briefly, in accordance with exemplary embodiments, communication module 221 manages communication between ontology system 220 and external programs and users, such as, for example, programs executing on user devices 160. In embodiments, communication module 221 receives natural language queries from user devices 160 and provides displayable results to user devices 160. As a program that executes in user space 230, communication module 221 utilizes the services provided by operating system 210 in order to communicate.

Referring to FIG. 2, parsing module 222, in embodiments, processes and parses natural language queries by analyzing the semantic properties of the queries and converting the natural language query into a form that can be processed by mapping module 223. Parsing module 222 provides a financial interpretation of a natural language query such that mapping module 223 can determine relevant database nodes that should be called in order to answer the query. Exemplary techniques for natural language parsing as carried out by parsing module 222, and which are in accordance with embodiments of the present invention, are described below in connection with FIGS. 4A and 4B.

Mapping module 223, in embodiments, is a software module that receives a financial interpretation of a natural language query from parsing module 222 and determines one or more nodes in a node database that can satisfy that query. According to embodiments, mapping module 223 constructs a query, such as an SQL query, that can be executed against a node database by data retrieval module 224.

In embodiments, data retrieval module 224 receives a query from mapping module 223 and executes that query against a node database in order to retrieve results relevant to a processed natural language query. Data retrieval module 224 receives query results and provides those results to ranking module 225.

As used herein, a "node" refers to containers (such as, for example, tables) in a database, whereby each node corresponds to a factor (or concept) in the ontology framework. In embodiments, a factor may have associated with it one or more nodes (tables). A factor that only has a single node associated with has all data associated with that factor stored in a single table. A factor associated with multiple tables stores data corresponding to the factor, such as sub-categories of the factor, in multiple corresponding tables. For example, one of the factors in the ontology framework is "Exposure." In some embodiments, the exposure factor can correspond to regional exposures that financial products are exposed to, and the corresponding "Exposure" node contains financial data for all regions where the exposure exists. Alternatively, the Exposure factor can correspond to multiple nodes (tables), each of which contains financial data corresponding to a subset of countries (e.g., European or Asian countries) or to individual countries (e.g., France, Germany, United Kingdom, Japan, and so on).

In embodiments, ranking module 225 receives query results from data retrieval module 224 and ranks those results based upon both the assigned importance of the relevant nodes from which the results were retrieved, as well as in accordance with descriptive indicators in the natural language query. For example, if a natural language query expresses an interest in low cost investment funds, then ranking module 225 would rank funds by cost from lowest to highest.

After ranking the query results, ranking module 225 then provides the ranked results to communication module 221. According to embodiments, communication module 221 transmits the ranked results to the appropriate user device 160 for display.

Figure 3A:
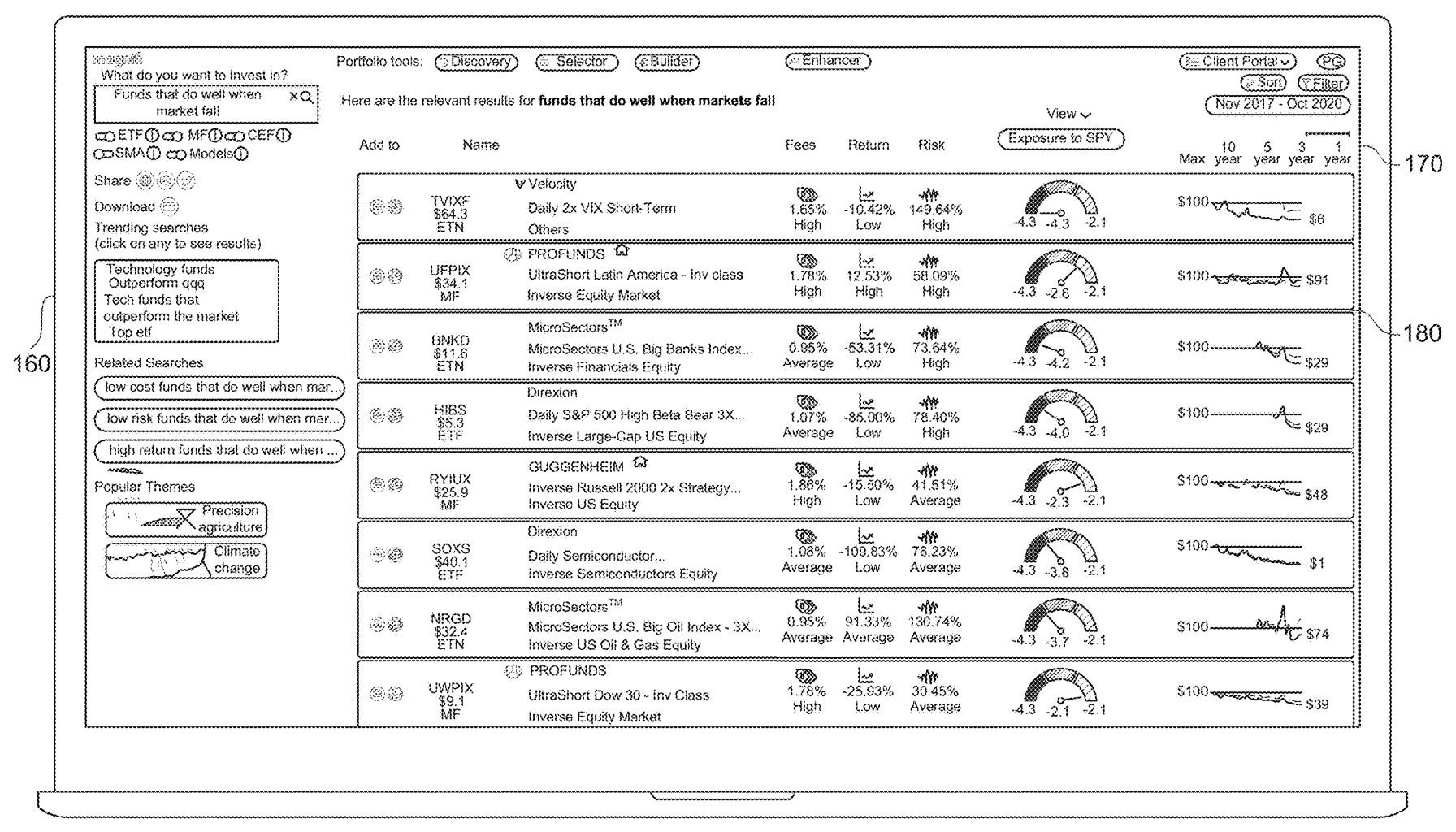

FIG. 3A depicts an exemplary user device 160 in accordance with embodiments of the present invention. The exemplary user device 160 of FIG. 3A is a laptop computer having a relatively large display 170. Laptop user device 160 executes a user application 180 that provides an end user with a graphical user interface (GUI) with which to interact in order to enter financially oriented natural language queries and to view the results of those queries. As shown, user application 180 provides an entry field that allows end users to type in free-form natural language queries. The entry field for user application 180 invites the end user with the question "What do you want to invest in?" As shown in the figure, the entry field contains the natural language query "Funds that do well when markets fall." Further, due to a relatively large display area that is possible on a laptop computer, user application 180 can display, in addition to identifiers for financial products that are responsive to the query, other metrics and graphics for each financial product, such as, for example, price performance graphs, and historical high, low, and average prices.

In embodiments, user application 180 transmits, using communication software executing on user device 160, natural language queries to computer system 110 and receives ranked responsive results from computer system 110. As shown in FIG. 3A, the results are displayed, in embodiments, to the right of the entry field. In the depicted example, at least eight financial products were found by computer system 110 to have been responsive to the end user's natural language query. In embodiments, these results are displayed in a ranked order, whereby the ranking is performed in accordance with techniques disclosed herein.

In embodiments, user application 180 also includes other features, such as, for example, providing end users with the ability to sort results, providing the ability to filter results, to display results over a given time horizon, and providing related searches that an end user may find interesting.

FIG. 3B depicts another exemplary user device 160 in accordance with embodiments of the present invention. The exemplary user device 160 shown in FIG. 3B is a tablet computer. Like the user device of FIG. 3A, tablet user device 160 of FIG. 3B has a display 170 that displays a user application, denoted by reference number 185. User application 185 provides similar functionality as user application 180. As shown in FIG. 3B, user application 185 has an entry field into which an end user can enter a natural language query. User application 185 provides an area where responsive results are displayed as well. As shown, due to the relatively large display area of a tablet device, user application 185 is also able to display additional information relating to financial products that are responsive to a natural language query. For example, user application 185 displays, for each financial product, a graph of the financial product's price performance over a predetermined time frame. In embodiments, user application 185 also displays additional metrics relating to displayed financial products, such as, for example, a high, low, and average price over a predetermined time interval.

Figure 3C:
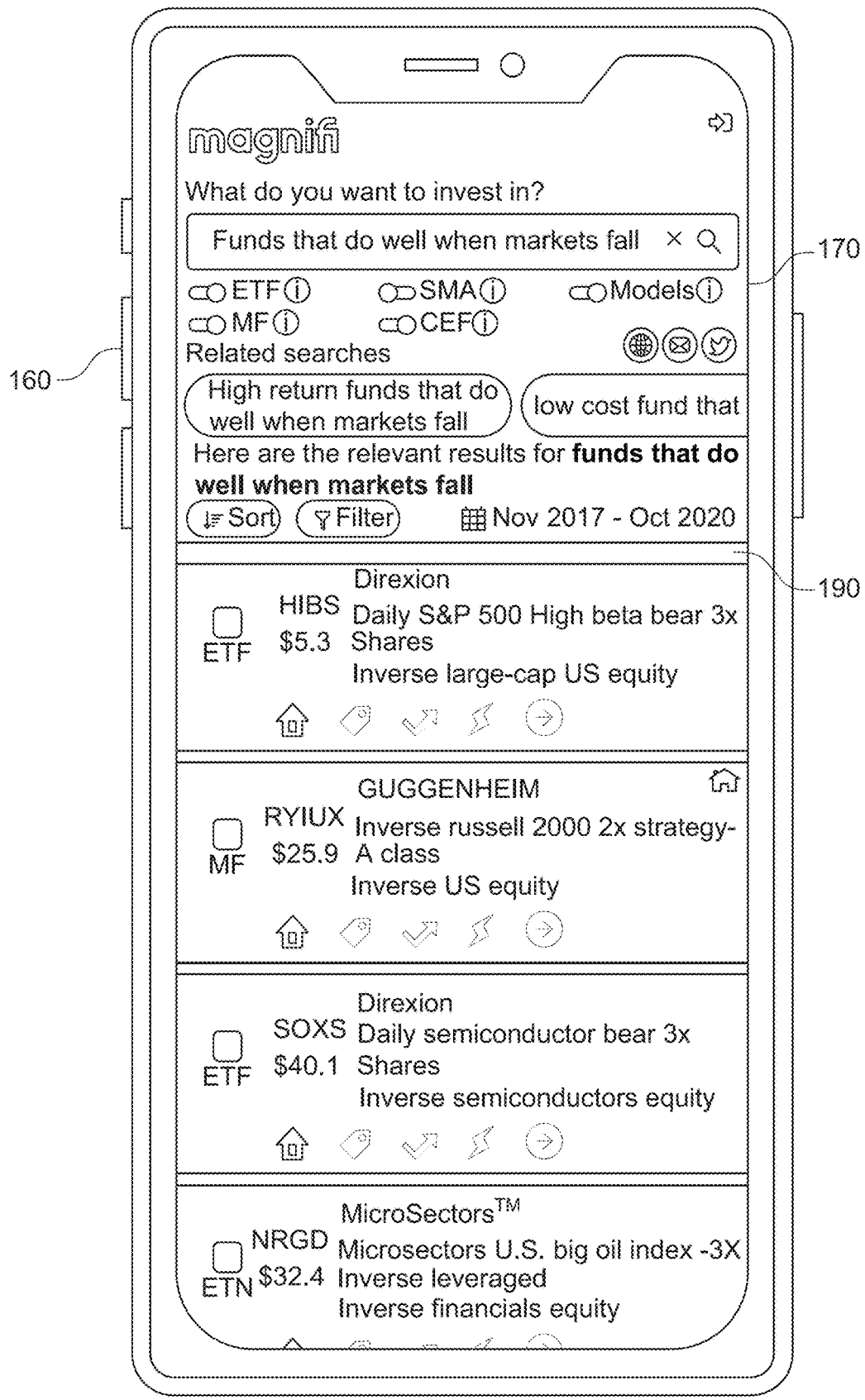

FIG. 3C depicts a third exemplary user device 160 in accordance with embodiments of the present invention. The exemplary user device 160 shown in FIG. 3C is a mobile device, such as a smartphone. As shown, user device 160 includes a display 170. User device 160 executes a user application 190 which, like user applications 180 and 185, provides an end user with a GUI with which to interact in order to enter financially oriented natural language queries and to view the results of those queries. As shown, user application 190 provides an entry field that allows end users to type in free-form natural language queries. Like the previously displayed user applications, the entry field for user application 190 invites the end user with the question "What do you want to invest in?" As shown in the figure, the entry field contains the natural language query "Funds that do well when markets fall."

Due to the limited display area of a smartphone, however, user application 190 displays a smaller amount of information than the displays depicted in FIGS. 3A and 3B. Further, as shown in FIG. 3C, information responsive to the natural language query is displayed directed below the entry field, rather than beside the entry field.

Other application configurations that provide similar or equivalent functionality as user applications 180, 185, and 190 are within the scope of the present invention. User devices that are capable of running such applications include desktop and laptop computers, tablet computers, smartphones, personal digital assistants, and wearable computing devices (such as smart watches). Such user devices are equipped, in embodiments, with wired or wireless network connectivity and are configured to transmit natural language queries to a remote or local computer system (such as, for example, computer system 110), to receive results of those queries from the remote or local computer system, and to display those results on a display operatively connected to the user device. Furthermore, any of applications 180, 185, and 190 may comprise standalone computer software that is installed and executed locally on a user device or, alternatively, these applications may reside on a local computer network, the internet, or a cloud computing environment and may be invoked remotely by a user device. Relatedly, any of applications 180, 185, and 190 may comprise a web browser on a user device that executes remote application software via communication with a web server.

FIGS. 4A and 4B depict techniques for natural language parsing, in accordance with exemplary embodiments of the present invention. The techniques depicted in FIGS. 4A and 4B may be executed by parsing module 222 in conjunction with mapping module 223. FIG. 4A depicts an exemplary technique for parsing a natural language query and for providing a financial interpretation of that query. As shown, in this example, parsing module 222 receives query text "low cost emerging markets." In accordance with one or more semantic parsing techniques known in the art, parsing module 222 divides the query into constituent parts, whereby different parts of speech are identified. Thus, as shown, the word "low" is identified as an adjective that modifies the noun "cost," while "emerging" is a verb that applies to the word "market."

As shown in FIG. 4A, each word or phrase is processed to determine its semantic properties. For example, as shown in the first row of the table depicted in FIG. 4A, the adjective "low" is "lemmatized," and determined to be part of a noun phrase with head word "cost." The word is identified as an adjectival modifier having left and right edge "low." These semantic properties are depicted in the second column of the table and, in embodiments, are determined by parsing module 222. The third column of the table shows the financial interpretation of the input text. The interpretation of the input text based upon the semantic properties of that text is performed, in embodiments, by mapping module 223. Here, mapping module 223 interprets the text "low" as corresponding to a node identified as "low," whose parent node is "preference" in the node database. Alternatively, the node low may also have a parent node of "stock ticker."

As shown in FIG. 4A, parsing module 222 performs similar semantic analysis and mapping module 223 performs similar financial interpretation for the terms "cost" and "emerging markets."

Additional examples of parsing and financial interpretation are depicted in the table of FIG. 4B. As shown in the figure, the input text is "tech funds without netflix." In this example, parsing module 222 analyzes the semantic properties of each word in the text. As shown, "tech" and "funds" are determined to be nouns that are combined into a compound noun, "netflix" is determined to be a proper noun, and "without" is determined to be a preposition that modifies the compound noun "tech funds" and has as its object the proper noun "netflix." After parsing module 222 determines the semantic properties of each of the words in the input text, mapping module 223 determines a financial interpretation for each of the terms. For example, the word "tech" is determined to be a node whose parent is "exposure/theme." Alternatively, mapping module 223 determines that the word tech can correspond to a node "information technology," which may be a synonym for the word "tech." Accordingly, the phrase "information technology" has a parent node "exposure/sector." As shown in the figure, mapping module 223 similarly determines financial interpretations for the terms "funds," "without," and "netflix."

Figure 5:
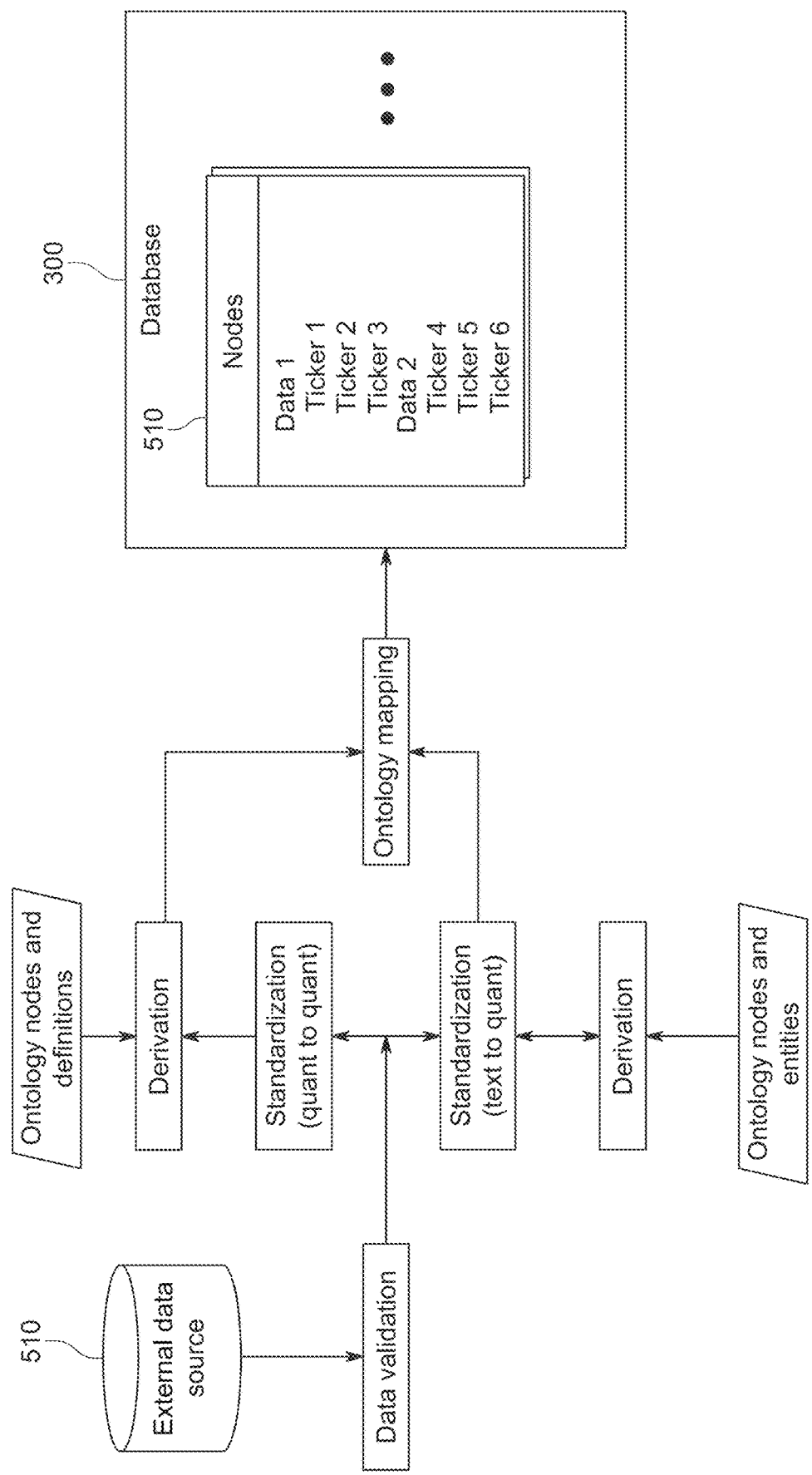
FIG. 5 is a block diagram that illustrates the initialization of a node database in accordance with exemplary embodiments of the present invention.

FIG. 5 is a block diagram that illustrates the process of initializing a node database in accordance with exemplary embodiments of the present invention. The node database, such as node database 300 depicted in FIG. 5, stores the financial data that is provided by computer system 110 in response to receiving natural language queries from user devices. In exemplary embodiments, the steps depicted in FIG. 5 may be carried out by computer system 110 or, alternatively, by an administrative computer (not depicted) which is responsible for the update and maintenance of database 300.

As shown in FIG. 5, external data is received from external data source 510. According to embodiments, external data source 510 may be one or more databases that are independent of and maintained outside of system 100. External data source comprises data provided by one or more data vendors. This data comprises raw "primary" data relating to financial products. For example, the external data may include data stored in the databases of third-party vendors such as Morningstar, Inc., which provides publicly available data such as, for example, historical prices of the financial products.

As shown in FIG. 5, the external data from external data source 510 is passed through a data validation process, which can be an optional step in the initialization of the node database. In exemplary embodiments, the data validation process implements checks on the data before being stored in database 300. For example, data checks may include identifying and rejecting data "noise" (i.e., anomalies in the data), identifying and rejecting corrupt data, rejecting any financial products that are no longer active, and other similar data checks.

After the external data has been validated, the validated data can then be standardized. In embodiments, the validated data may be standardized by using "quant-to-quant" and/or "text-to-quant" standardization, to name a few.

In quant-to-quant standardization, each of the primary raw data items may be converted to a derived ontology variable based on the financial definition of that specific ontology node. For example, if price data for one or more stocks is received, then that data is converted to a variable corresponding to one or more of the nodes in the ontology framework, which can be asset type (for stocks), attribute (for price), and/or sponsor (for the stock issuer).

In text-to-quant standardization, textual data received through from external data source 510 may be converted to structured quantitative data. For example, prospectuses of financial products that are in text format can be received and analyzed for a concept like "robotics." Those products corresponding to "robotics" are converted to an appropriate variable corresponding to one or more nodes in the ontology framework. In embodiments, financial products corresponding to a certain concept (such as "robotics") are assigned a score for that concept, which reflects how strongly the financial product relates to that concept. This can be accomplished by textual analysis of the validated external data. For example, a prospectus which only makes a passing mention of "robotics" will tend to be assigned a low score for that concept, while a financial product issued by a company with "Robotics" in its name may have a higher score.

Next, the standardized data (whether by the quant-to-quant or text-to-quant standardization process, to name a few) is passed through a derivation process. As shown in FIG. 5, in embodiments, the data standardized with quant-to-quant standardization can be processed through a derivation step using ontology nodes and definitions. In embodiments, data standardized using text-to-quant standardization can be processed through a derivation step using ontology nodes and entities. Each type of derivation is described herein.

The derivation of quant-to-quant standardized data, where the standardized data comprises, for example, a stock price historical time series, may comprise, in embodiments, the derivation of historical returns of the stock price over different time horizons as the price fluctuates over time. These historical returns can be used to compute an average return for a specific period of time. This average return value will then be assigned to the node variable for the financial product (i.e., the stock for which the average return was computed). This process is repeated for other financial products. Further, the value assigned for the financial product may vary by product type. For example, if the product is a bond, then the relevant variable may be yield to maturity or duration.

As shown in FIG. 5, the ontology nodes and definitions can be used in computing the derived value of quant-to-quant standardized data. In embodiments, the ontology nodes and definitions define the financial rule sets and specify how statistical or regression analysis is to be applied to certain financial products in order to arrive at a correct derived value. For example, the annualized volatility for a financial product may be calculated from daily returns from the time series for the financial product, which are then, in accordance with rules defined in the ontology nodes and definitions data set, averaged over a one year time horizon and then annualized.

For text-to-quant standardization, quant scores can be derived for financial products using ontology nodes and entities. According to embodiments, the quant score for a financial product can be determined based on how strongly (or frequently) the text pertains to an ontology node. The textual context of a concept may be analyzed through the presence of "entities" in the text document (e.g., in a Form 10-K filing). For example, for a node in the ontology framework called "solar," a financial product whose relevant text document mentions the "production of solar cells" will receive a higher quant score than if the text document makes a passing mention of "solar regulations."

As shown in FIG. 5, once values have been derived for the standardized quant-to-quant and text-to-quant data, these values can be processed by an ontology mapping step. According to embodiments, once values are derived for a collection of nodes in database 300, attributes such as cost, price, returns corresponding to that data may be mapped and added to respective data tables having the same ontological structure as the ontology framework. Once the ontology mapping is performed, the derived values can be stored in database 300.

Figure 6:
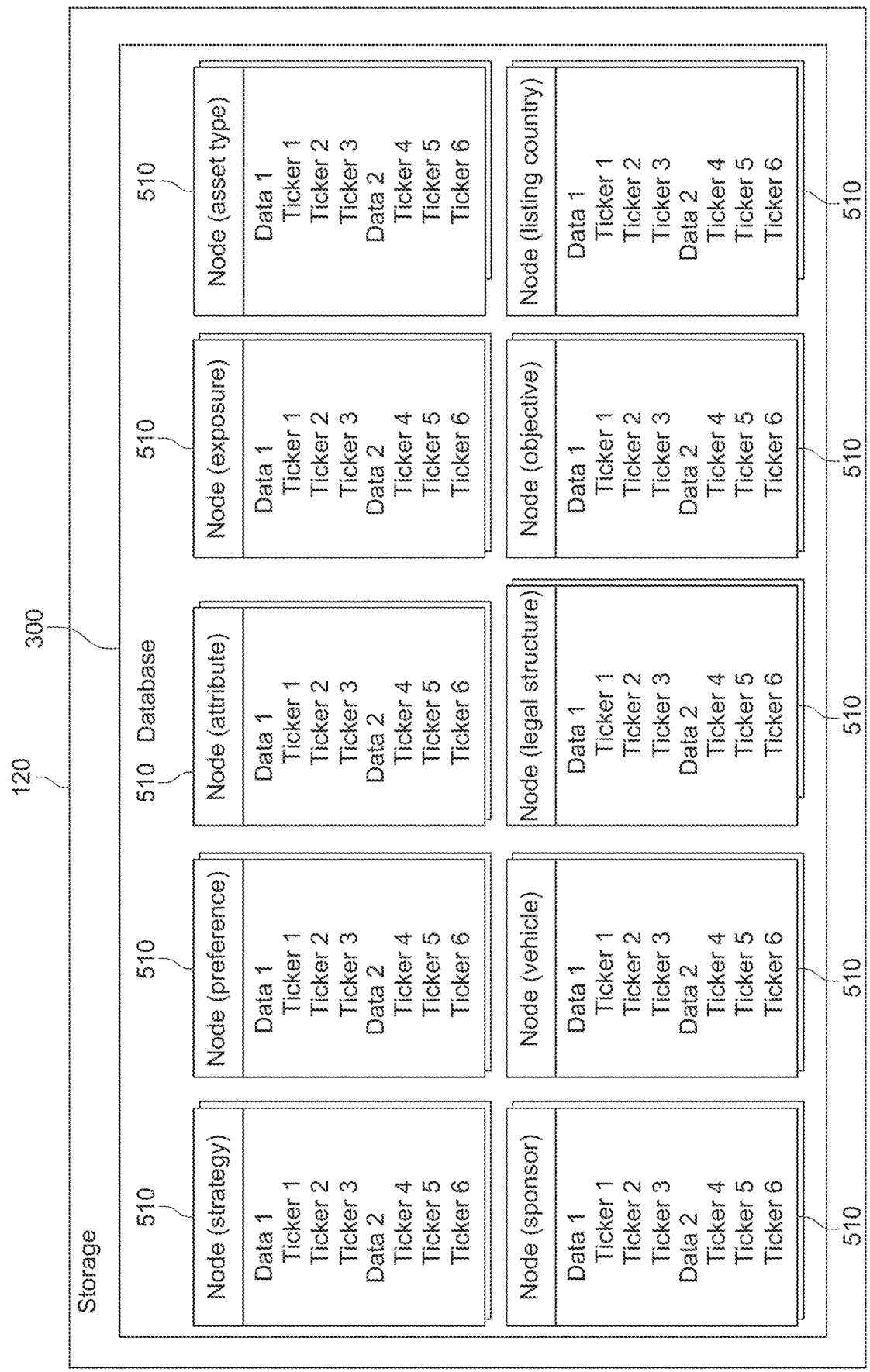
FIG. 6 is a block diagram that illustrates the structure of a node database in accordance with exemplary embodiments of the present invention.

FIG. 6 is a block diagram of database 300, which, in accordance with exemplary embodiments, is a database that implements the structure of the financial ontology framework. As shown, database 300 is stored within storage 120 comprises a plurality of nodes 510. Each node 510 comprises one or more database tables. Each node corresponds to a factor of the financial ontology framework. Each factor has one or more corresponding database tables. As shown in FIG. 6, in the depicted embodiment, the factors include: Strategy, Preference, Attribute, Exposure, Asset Type, Sponsor, Vehicle, Legal Structure, Objective, and Listing Country, to name a few. In embodiments, the factors may include all ten of these factors, less than ten factors, additional factors, and/or substitute one or more of these factors, to name a few. Each of the tables contains a mapping between a data value that corresponds to one or more types or categories of financial products and one or more financial product identifiers, shown in FIG. 6 as "tickers." Thus, in embodiments, the data values (e.g., Data 1 and Data 2) are types of financial products, such as for example, exchange traded funds (ETFs) or mutual funds (MFs). The corresponding tickers are the individual names for each of the funds relevant to a given node. For example, node 510 (Listing Country) may have one or more corresponding data tables for countries in which particular ETFs and MFs are listed. Thus, if an ETF with a ticker symbol ETF1 is listed in the United States and the United Kingdom, then ETF1 will be present in node tables "United States" and "United Kingdom." Similarly, if an ETF with a ticker symbol ETF2 invests in securities that are exposed emerging market countries, then ETF2 will be present in node table "Emerging Markets," which is a database table within the collection of tables under node 510 (Exposure).

FIG. 7 is an example of a financial database that stores an exemplary set of financial data in accordance with conventional art techniques. As shown, conventional art databases include very few tables. Indeed, the exemplary database shown in FIG. 7 only depicts two tables, one for ETFs and one for MFs. Each table has as its key the ticker symbol for the corresponding financial product type (i.e., ETF or MF). Thus, the ETF table has entries for ETF1, ETF2, and so on, while the MF table has entries for MF1, MF2, and so on.

As shown in FIG. 7, all of the corresponding data for a given ETF or MF is stored in a single row corresponding to the ETF or MF. For example, ETF1 has associated with it Price, Fee, Attributes, its emerging market exposure (EM), the region the ETF trades in, the percentage of the ETF devoted to tech investments (Tech), the investment theme of the ETF, and so on.

The conventional art database structure depicted in FIG. 7 has technological disadvantages. For example, in order to locate ETFs and MFs that are responsive to a given natural language query, the entire ETF and/or MF table needs to be selected and scanned, which is a computationally intensive process, and may be time consuming. In addition, the structure is inflexible. For example, in order to add additional data elements associated with ETFs or MFs, new columns need to be appended to the ETF and MF tables. In order to achieve this, many database systems need to be temporarily taken out of operation while the columns are added, thus increasing unnecessary down time. This is especially true when the columns are added (for performance reasons) between existing columns. Moreover, application programs that query these tables may also need to be updated in order to account for the new data columns. In exemplary embodiments, the present invention provides a solution to this technological problem by using a multi-factor financial ontology framework that is structured in a manner to enable quick and efficient retrieval of financial data. Through a unique and inventive computer solution, relevant data is retrieved in response to a query by performing natural language parsing of the query and directly targeting data values and financial product identifiers within one or more nodes of a 10-factor ontology framework using the parsed terms. This minimizes burdensome computer processing and allows the computer platform to operate more efficiently to provide quick and accurate search results.

Further, the conventional art database structure is wasteful and less efficient. Not all ETFs and MFs have relevant data for all columns, thereby wasting storage space unnecessarily. For example, if the majority of ETFs stored in the EFT table are not exposed to emerging market economies, then the majority of the rows in that table will have a null value or a zero value for the EM column. Since storage space needs to be reserved for an EM value for each ETF, most of that storage space will be unused.

Figure 8:
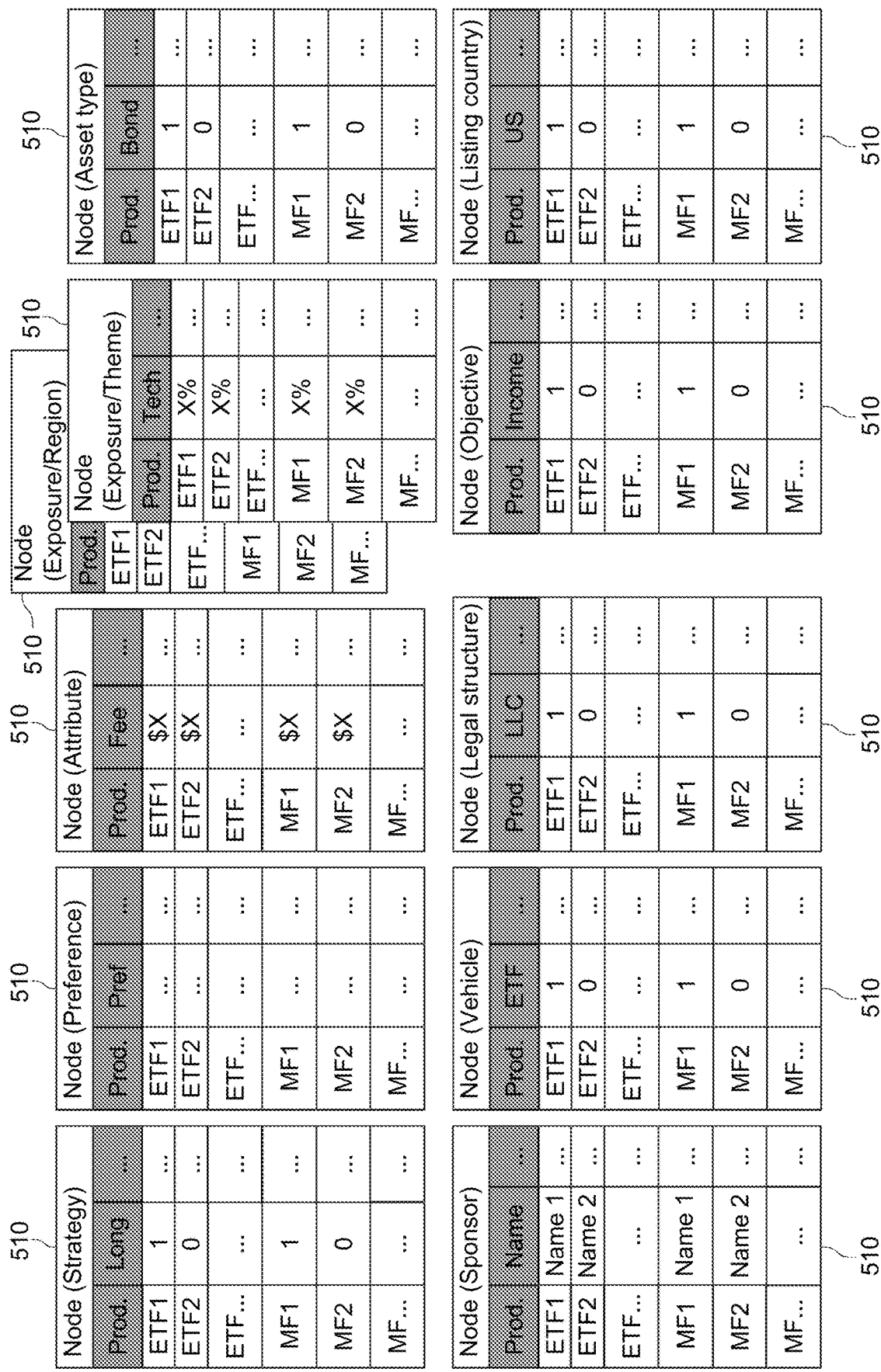
FIG. 8 is a block diagram that illustrates the storage of financial data in a node database in accordance with exemplary embodiments of the present invention.

FIG. 8 depicts node tables 510 in accordance with exemplary embodiments. Node tables 510 depicted in FIG. 8 store a similar financial data set as that shown for the conventional art tables shown in FIG. 7.

As in FIG. 6, there are ten nodes in FIG. 8, which correspond to the ten factors that comprise the financial ontology framework as shown in the embodiment illustrated in FIG. 6. In embodiments, when the number or type of factor is adjusted with respect to FIG. 6, a corresponding change will be made with respect to the nodes in FIG. 8. As shown, these nodes are denoted as nodes 510, and each comprises one or more corresponding database tables. As with FIG. 6, the nodes depicted in FIG. 8 include: Strategy, Preference, Attribute, Exposure, Asset Type, Sponsor, Vehicle, Legal Structure, Objective, and Listing Country. According to embodiments, each database corresponds to particular type of datatype for one of the listed factors, each database table contains one or more entries (or samples) (e.g., rows), each of which corresponds to a financial product that is one of the categories. For example, the financial products depicted in FIG. 7 are ETFs and MFs. Each database table for a given node 510 contains as entries (or samples) (e.g., rows) only those financial products that are relevant to the concept represented by that node. Addition information or attributes about each respective product (e.g., row) is included in the table in, e.g., columns.

For example, node 510 (Strategy), as depicted, has a single table. Node 510 (Strategy), like the other nodes 510, has a column for financial products, which stores the tickers (or identifiers) for the financial products stored in the table. The other columns in the database table are relevant to the types of possible investment strategies that the financial products undertake. For example, the financial products stored in node 510 (Strategy) can invest in a strategy that is net long or net short stocks or other financial securities. Thus, as shown, ETF1 and MF1 have a net long strategy (Long=1), while ETF2 and MF2 do not have a net long strategy (Long=0). The samples contained in node 510 (Strategy) may be further limited by searching (e.g., filtering) the contents of node 510 based on the data items in one or more columns. Because the node 510 is limited by to one of the key attributes being searched for, such a searching or filtering option is faster and has less latency if the filtering were performed using a full or larger database as was the case in the conventional art.

Other strategy-relevant columns are depicted in the database table for node 510 (Strategy). As an alternative, however, these other columns can be moved into one or more different tables that can be linked to the Strategy concept. This provides for both a more focused match for a natural language query, as well as a performance improvement in responding to such a query, as the system that implements the financial ontology framework will access a smaller table, which entails lower latency resulting from a shorter query processing time and from lower data retrieval time.

For example, referring to FIG. 8, it is possible that, instead of node 510 (Strategy) comprising a single table with multiple strategy related columns, node 510 (Strategy) can comprise, in embodiments, multiple tables, where each table corresponds to a single strategy. One such embodiment (not depicted) may provide for three tables for node 510 (Strategy), namely, a Long table, a Short table, and a Leveraged table. In this embodiment, only those financial products that pursue a long strategy would be stored in the Long table, only those financial products that pursue a short strategy would be stored in the Short table, and so on.

An example of a multi-table node depicted in FIG. 8 is node 510 (Exposure). As shown in the figure, Node 510 (Exposure) has two database tables, namely, Exposure/Theme and Exposure/Region. The Exposure/Theme table comprises multiple columns, each representing an investment theme that a particular financial product can invest in. For example, ETF1, ETF2, MF1, and MF2 are shown as investing a particular percentage of funds in technology (demonstrating a Tech theme). Other potential themes (for which a corresponding column in the table may exist) include Robotics, Social Consciousness, Precision Medicine, Clean Energy, and so on.

As noted, Node 510 (Exposure) also has a database table entitled Exposure/Region. This table, in embodiments, has columns which relate to different investment regions. For example, the Exposure/Region table may include a column for North America, a column for South America, a column for Europe, and so on. For each ETF or MF listed in the Exposure/Region table, the table may store a percentage of funds invested in each region.

As shown in FIG. 8, the other nodes 510 store data in a similar way. A technical advantage of storing financial data in this manner is that since only relevant financial products are stored in each node 510, it lowers latency time in performing queries. For example, in the above example, only ETFs and MFs that invest using a particular investment strategy are stored in the database table for node 510 (Strategy); those that do not adhere to a particular strategy are not stored in such a table. Similarly, only ETFs and MFs that invest in accordance with a particular theme are stored in the Exposure/Theme table of node 510 (Exposure); ETFs and MFs that do not invest in accordance with a theme are not stored in this table.

In comparison with conventional art techniques, the technique of storing financial data shown in FIG. 8 has technological advantages. Since the data structure depicted in FIG. 8 involves smaller, more granular database tables, query response times are reduced and computational power in obtaining relevant results are also reduce. Further, the topology of the data structure of FIG. 8 is more flexible because it is possible to flexibly add additional database tables under a given node, rather than by adding additional columns to existing tables. For example, if the ontological factor "exposure" were to include another dimension other than Theme or Region, a third database table could be added to node 510 (Exposure) to account for that dimension. As an example, another exposure dimension can be "Sector," where sector can be financial services, manufacturing, health care, and so on. In order to capture which financial products are invested in certain sectors, a new table (e.g., Exposure/Industry) can be added under node 510 (Exposure) to store ETFs and MFs that invest certain percentages of their funds in particular sectors.

Figure 9:
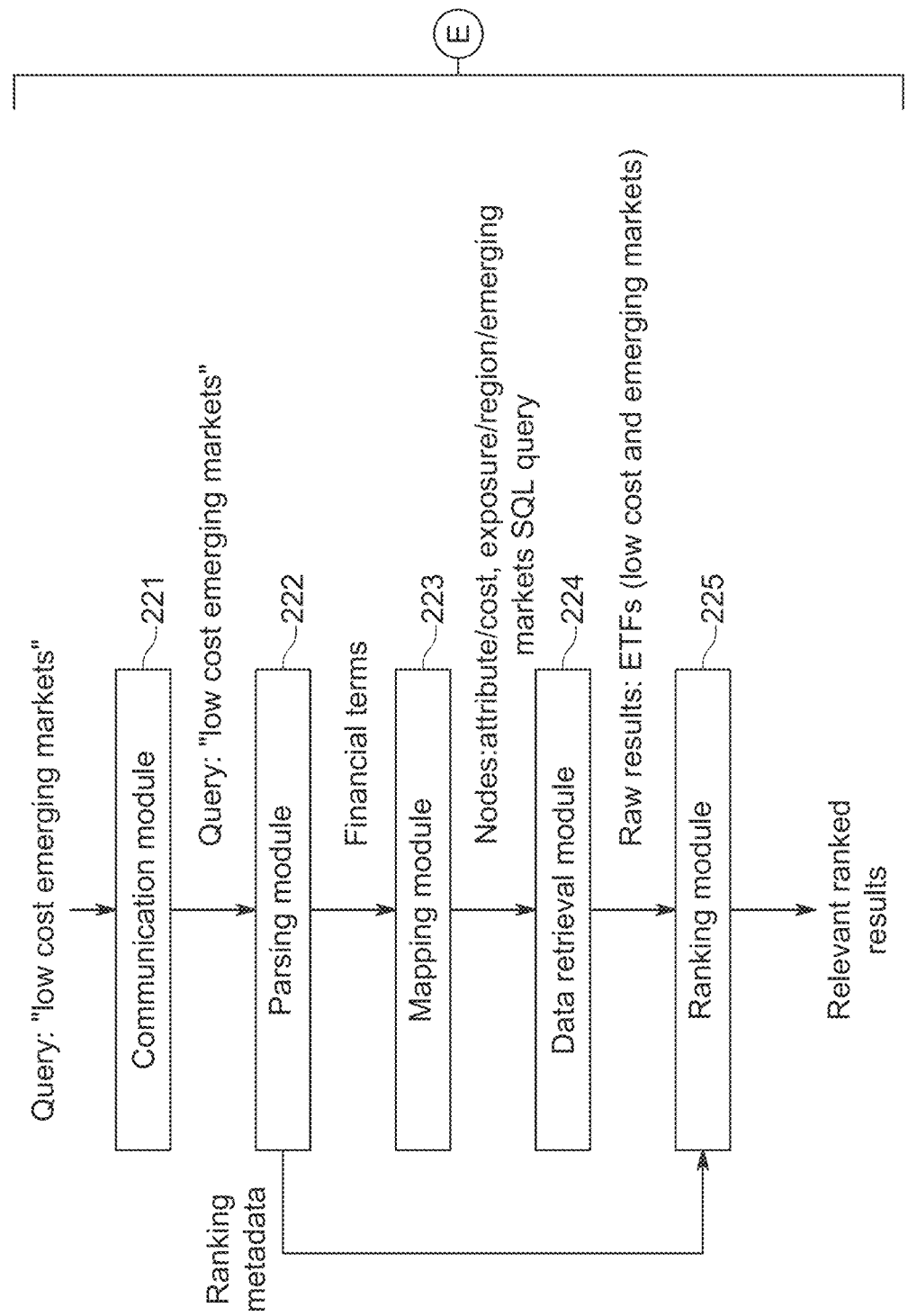
FIG. 9 is a flow diagram that illustrates the processing of a natural language query for obtaining financial information and the retrieval of responsive results in accordance with exemplary embodiments of the present invention.
Figure 9:
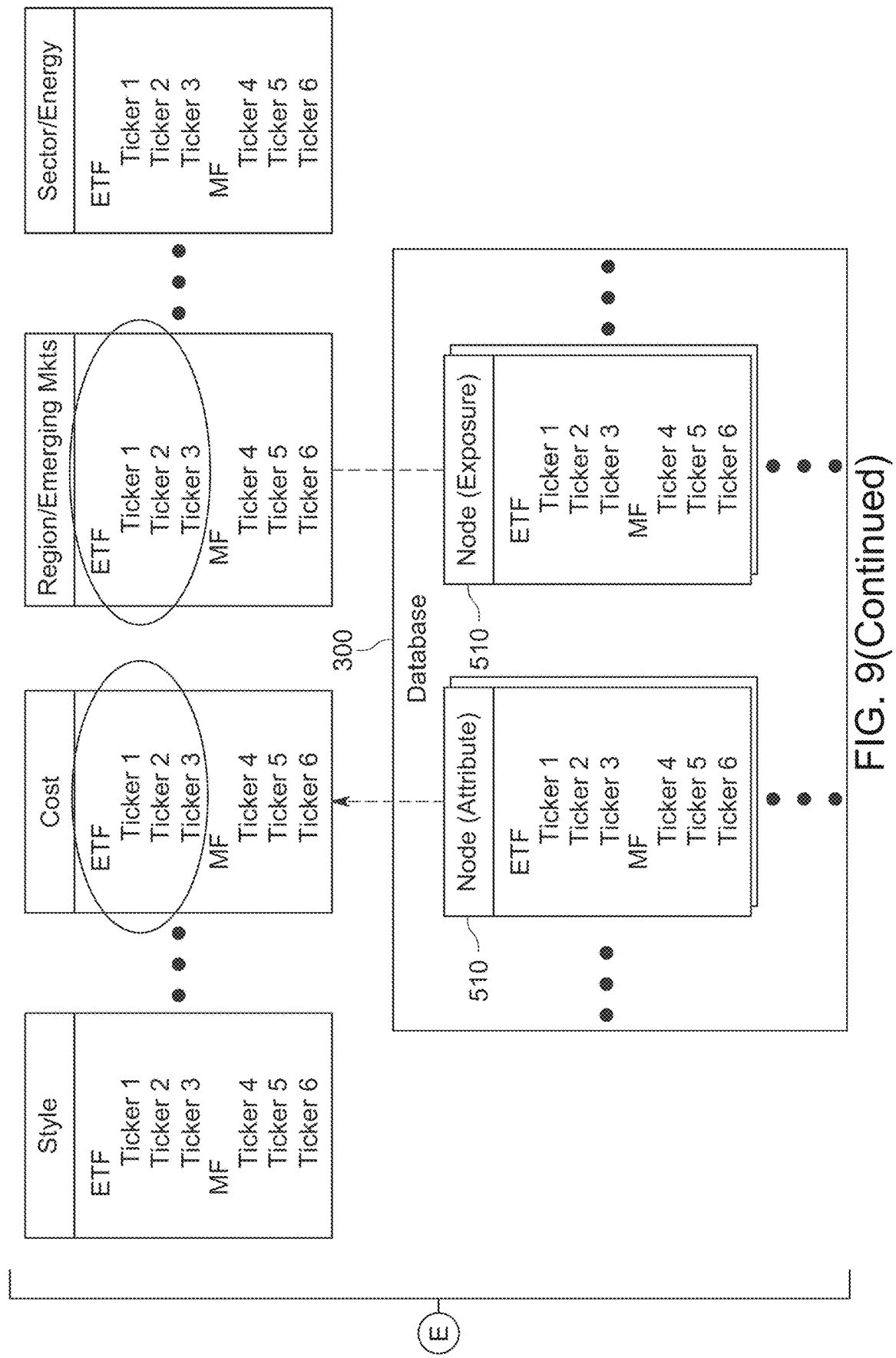

FIG. 9 is a flow diagram that illustrates the processing of an exemplary natural language query for obtaining financial information and the retrieval of responsive results in accordance with exemplary embodiments of the present invention. In embodiments, the steps depicted in FIG. 9 are carried out by the modules of computer system 110.

As shown in FIG. 9, communication module 221 receives a natural language query, which is "low cost emerging markets." In embodiments, this natural language query is received from a user device, such as user device 160. According to embodiments, the natural language query may be entered into an entry field in a user interface, such as user applications 180, 185, and 190 depicted in FIGS. 3A, 3B, and 3C, respectively. The natural language query may, in embodiments, be received at a Uniform Resource Locator (URL) that identifies computer system 110 on the Internet. Communication module 221 then passes the natural language query to parsing module 222. In accordance with natural language parsing techniques known in the art, including the techniques described above, parsing module 222 parses the query into financial terms and ranking metadata, which is used to rank results that are responsive to the natural language query. For example, in the natural language query "low cost emerging markets," the terms "cost" and "emerging markets" are financial terms, while the adjective "low" is ranking metadata. As shown in FIG. 9, the parsed financial terms are provided by mapping module 223, while the ranking metadata is provided to ranking module 225.

Next, mapping module 223 receives the financial terms and maps those terms to nodes and tables in database 300. For example, in the example shown in FIG. 9, mapping module 223 maps the financial terms "cost" and "emerging market" to the nodes 510 Attribute and Exposure. Further, because node 510 (Attribute) has a plurality of tables defined as corresponding to that node, mapping module 223 further maps the term "cost" to the relevant table under this node.

Similarly, mapping module 223 maps the financial term "emerging markets" to node 510 (Exposure). As there are multiple database tables defined as corresponding to this node, mapping module 223 further maps the term "emerging markets" to the "Region/Emerging Markets." Once mapping module 223 determines the relevant nodes and database tables from which to retrieve data responsive to the natural language query, mapping module 223 then generates an SQL query to select responsive data from those tables. The SQL query is then provided to data retrieval module 224.

Data retrieval module 224 receives the SQL query from mapping module 223. According to embodiments, data retrieval module 224 executes the SQL query against database 300. In FIG. 9, the SQL query corresponds to natural language query "low cost emerging markets." As such, the query selects data from the Cost table under node 510 (Attribute) and the Region/Emerging Markets table under node 510 (Exposure). Since the natural language query includes both low cost and emerging markets, the SQL query joins the Cost and Region/Emerging Market tables in order to obtain financial products that meet both those criteria. In alternative embodiments, the SQL query does not join the two tables. Rather, each table may be queried separately in order to retrieve financial products that meet either condition or both.

As shown in FIG. 9, data retrieval module 224 retrieves Ticker 1, Ticker 2, and Ticker 3 from the Cost table and Ticker 1, Ticker 2, and Ticker 3 from the Region/Emerging Markets table. These results (referred to in the figure as raw results) are then provided to ranking module 225.

According to embodiments, ranking module 225 can receive the raw results from data retrieval module 224, as well as the ranking metadata from parsing module 222. Ranking module 225 then ranks the raw results in accordance with the ranking metadata. For the example depicted in FIG. 9, ranking module 225 receives raw results Ticker 1, Ticker 2, and Ticker 3, which are ETFs that satisfy both the "cost" and "emerging markets" criteria of the natural language query. Since the ranking metadata includes the term "low," which modifies the financial term "cost" in the natural language query, according to embodiments, ranking module 225 sorts the resulting ETF tickers in ascending order of cost, that is, lowest cost ETF, followed by the next lowest cost, and so on. Further, in some embodiments, ranking module 225 selects only those ETFs that meet predetermined criteria for being emerging markets and discards the rest. For example, ranking module 225 may determine that only Ticker 1 and Ticker 2 correspond to emerging markets and, accordingly, are responsive to the natural language query "low cost emerging markets." In this way, ranking module 225 converts the raw results into relevant ranked results.

Once ranking module 225 determines relevant ranked results that are responsive to the natural language query, ranking module 225 provides those relevant ranked results to communication module 221 for subsequent transmission to the user device 160 which initially sent the natural language query. In embodiments, user device 160 receives the ranked results and displays those results on a display within a user application such as, for example, user applications 180, 185, and 190 depicted in FIGS. 3A, 3B, and 3C, respectively.

Figure 10:
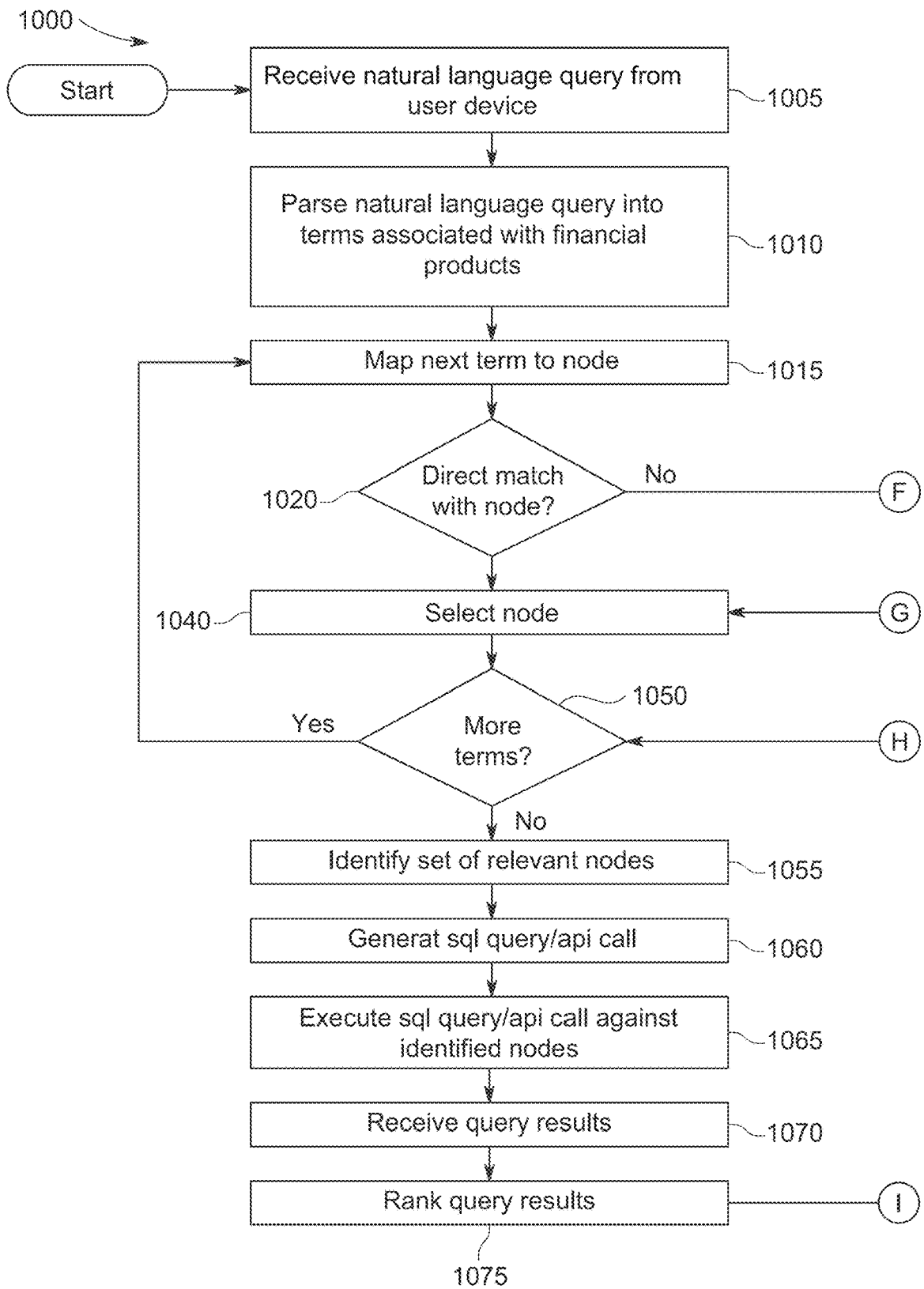
FIG. 10 is a flow diagram that illustrates a method for providing financial information responsive to a natural language query from a user device in accordance with exemplary embodiments of the present invention.
Figure 10:
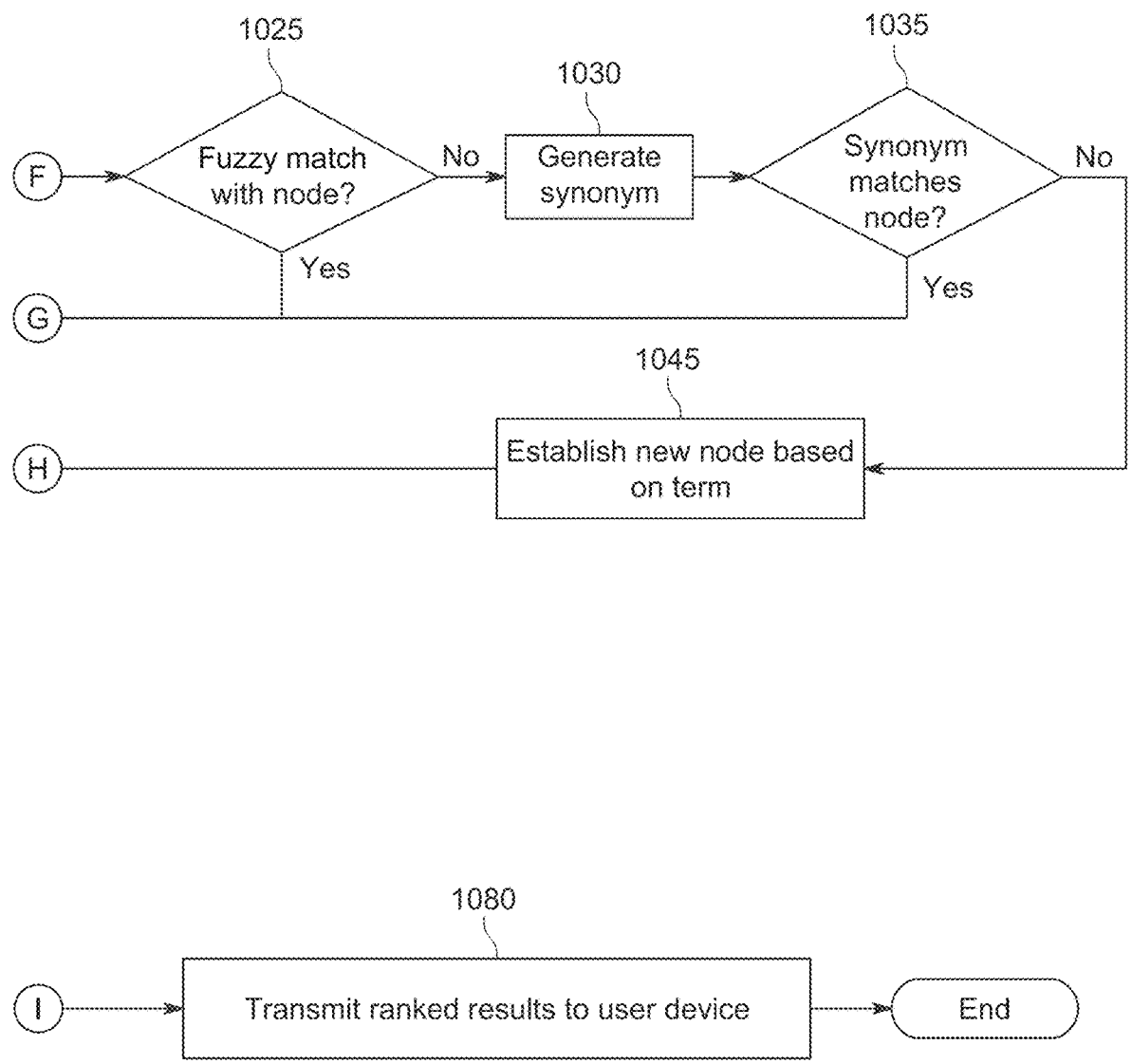

FIG. 10 is a flow diagram that illustrates a method 1000 for providing financial information responsive to a natural language query from a user device in accordance with exemplary embodiments of the present invention. According to embodiments, method 1000 may be carried out by computer 110, whereby the individual steps are carried out by the different modules of ontology system 220 described herein.

Method 1000 begins at step 1005, where computer system 110 receives a natural language query from a user device, such as, for example, user device 160. According to embodiments, step 1005 is carried out by communication module 221. Natural language query may be, in embodiments, a string of words and phrases entered on a user interface of user device 160 and transmitted by user device 160 to computer system 110. Method 1000 then proceeds to step 1010.

At step 1010, the natural language query received in the prior step is parsed into terms associated with financial products. In embodiments, step 1010 may be carried out by parsing module 222 in accordance with natural language parsing techniques known in the art. The financial terms into which parsing module 222 parses the natural language query are then provided to mapping module 223. Method 1000 then proceeds to step 1015.

At step 1015, the terms provided by parsing module 222 are mapped, sequentially, to nodes in a node database, such as, for example, database 300. The mapping process is performed, in embodiments, by mapping module 223. Mapping module 223 determines, at step 1020, where the term directly matches a given node. For example, if a term provided is "cost" and a table named "Cost" exists under any of the nodes in database 300, then mapping module 223 determines that there is a direct match between the financial term and the node. In this case, method 1000 proceeds to step 1040, where the node is selected by mapping module 223.

If, however, mapping module 223 determines that there is no direct match for the financial term, then method 1000 proceeds to step 1025. In embodiments, mapping module 223 determines that there is no direct match when there is no database table under any node that has a name that matches the financial term. For example, if the natural language query calls for "health sector," and there is no table named "Sector" under any node in database 300, then mapping module 223 would determine that there is no direct match for this term.

At step 1025, in embodiments, mapping module 223 determines whether there is a fuzzy match for the term with any node or table in database 300. According to embodiments, mapping module 223 determines whether the financial term is similar in name to a node or table in database 300. The fuzzy matching is carried out in accordance with one or more fuzzy matching algorithms that are known to those of skill in the art. If mapping module 223 finds a fuzzy match for the term in database 300, then method 1000 proceeds to step 1040, where the matched node is selected by mapping module 223.

If, however, mapping module 223 fails to find a fuzzy match for the financial term, then method 1000 proceeds to step 1030. At step 1030, mapping module 223 generates one or more synonyms for the financial term. For example, if the natural language query includes the term "health sector" and there is no matching node for this term, then mapping module 223 may generate one or more synonyms for the term, such as, for example, "health industry" or "wellness industry." Method 1000 then proceeds to step 1035.

At step 1035, in embodiments, mapping module 223 determines whether the generated one or more synonyms match any nodes 510 or associated tables in database 300. If there is a match, then method 1000 proceeds to step 1040 where mapping module 223 selects the matching node. If there is no nodes or tables that match with any of the generated synonyms, then method 1000 proceeds to step 1045.

Step 1045 is reached if the financial term does not match any nodes or tables, either directly, with a fuzzy match procedure, or by matching synonyms. At step 1045, ontology system 220 establishes a new node corresponding to the financial term. According to embodiments, the new node is given the same name as the financial term. In embodiments, the new node is fed into the data derivation process (as shown in FIG. 5) dynamically and in real-time, to generate data based on text to quant derivations using the new node. In this way, the financial ontology framework, and underlying database, may grow dynamically based on the terms that end users express interest in. Step 1045 may be carried out by mapping module 223 or, alternatively, may be carried out by a database administrator.

Once a node is selected at step 1040 or, alternatively, if a new node is created at step 1045, then method 1000 proceeds to step 1050. At step 1050, mapping module 223 determines whether there are any more financial terms provided by parser 222. If so, then method 1010 returns to step 1015. Otherwise, method 1000 proceeds to step 1055.

At step 1055, the set of nodes selected by mapping module 223 is selected as being relevant and responsive to the natural language query. In exemplary embodiments, pseudocode that illustrates the techniques by which parsing module 222 and mapping module 223 provide a financial interpretation for terms in a natural language query, and returns relevant nodes that are responsive to the interpreted query, as set forth in steps 1010 through 1055 of FIG. 10, may be as follows:

```
<Pseudo Code>

Initialize ONTOLOGY to all possible nodes, including node synonyms, globally
// Mapping term to node function
Set checkpoint to zero
Set ontology_matches as key, value pair
Set multiple_indices to an empty array
FOR word in query: do
    word = word text
    i = index position of word in query (1st word is 0)
// Check if word is already matched
    If i is greater than checkpoint:
        Continue to next word in for loop
    Understand word semantics and match accordingly with the ONTOLOGY Matching-Function
// Example 1:
    If part of speech of word is "Adjective":
        match -> call Matching-Function (word and ONTOLOGY)
        If match:
            Increase checkpoint by 1
            Add word as key, and match as value to ontology_matches
// Example 2:
    If part of speech of word is "Noun":
        If word is semantically linked to word2 in query with link "compound":
            If part of speech of word2 is "Noun":
                // word and word2 together potentially form a compound noun English phrase
                match -> call Matching-Function ( word+word2 and ONTOLOGY )
```

```
<Pseudo Code>
            if match:
                increase checkpoint by 2
        // as two words are matched
        Add word+word2 as key, and match as value to ontology_matches
        If no match:
            // phrase either doesn't make sense or doesn't exist in the ONTOLOGY
                // Try matching word and word2 separately
                match2 -> call Matching-Function (word and ONTOLOGY )
                if match2:
                    increase checkpoint by 1
                    add word as key, match2 as value in ontology_matches
                match3 -> call Matching-Function (word2 and ONTOLOGY )
                if match3:
                    increase checkpoint by 1
                    add word2 as key, match3 as value in ontology_matches
END FOR
// End Mapping term to node function
// Matching-Function
Set threshold to 90
// Start Ontology Restriction for speed improvement
Set word_length = number of characters in word
If word_length > 3:
    Set SUB_ONTOLOGY = From ONTOLOGY get nodes of length +/- (word_length MOD 10)+1
// End Ontology Restriction for speed improvement
/* Since text matching is computationally expensive, this step is done to remove potential nodes
from matching which we know will not have a.) an exact match with word as their length is
different b.) a more than 90% fuzzy match (threshold) with word as their length itself is more or
less than 90% of length of word */
Set match as fuzzy matches with word and SUB_ONTOLOGY with fuzzy score > threshold
If match received:
    return match
else:
    return no match
// End Matching-Function
// Identify Relevant Nodes Function
From mapping terms to Nodes, identify all query possibility combinations as query_possibilities
For possibility in query_possibilities: do
    Apply financial rules to possibility
// Example: If term is matched with multiple nodes in the ONTOLOGY, and the parent node for
one of the matched nodes is also parsed in the query, Then discard other possibilities
// Let's say for query "tech sector funds", the term "tech" is matched with theme and sector
ontology nodes, and sector ontology node is matched in query, then discard the "tech" match with
"theme" node as a possibility.
If rule not applicable:
    Discard Possibility
Return Relevant Nodes identified in relevant query possibility
```

Next, at step 1060, in embodiments, mapping module 223 generates an SQL query, an API call, or other type of database command or instruction, which, when executed on database 300, will retrieve relevant financial data that is responsive to the natural language query. In embodiments, the SQL query may select from a single table. Alternatively, if required, the SQL query may join one or more tables in a single query in order to select financial products that meet several criteria. For example, as described above, when the natural language query is "low cost emerging markets," mapping module 223 generates an SQL query that joins the Cost table of node 510 (Attribute) with the Region/Emerging Markets table of node 510 (Exposure). More than two tables may be joined, depending on the requirements of the natural language query.

In exemplary embodiments, pseudocode that illustrates the techniques by which mapping module 223 generates an SQL query at step 1060 may be as follows:

```
<Pseudo Code>
// Single SQL Generation
Initialize base SQL with placeholders for columns and tables
Set SQL = "Select s.id, s.ticker, s.name <column_place_holder> From security_master s
<table_place_holder>"
// For each node add column and table needed to SQL
FOR node in query: do
    DB_Column = node // attribute/cost
    Table = Lookup node ONTOLOGY node Factor (node) // attribute
    Add DB_Column to <column_place_holder> in SQL
    Add Table to <table_place_holder> in SQL
    Add JOIN Clause for table with security_master
```

An exemplary SQL query generated by mapping module 223 that corresponds to the natural language input query "low cost emerging markets," and which selects from the nodes "cost" and "emerging markets," may be as follows:

```
SELECT s.id,
    s.name,
    s.ticker,
    a."attribute/cost", er."exposure/region/emerging_markets"
FROM security_master s,
    attribute a,
    exposure_region er
WHERE s.id = a.id
    AND s.id = er.id
```

Next, at step 1065, the SQL query or API call is called and executed against the identified set of nodes and tables. In embodiments, step 1065 is carried out by data retrieval module 224. After executing the SQL query or API call, method 1000 proceeds next to step 1070.

At step 1070, data retrieval module 224 receives the results of the SQL query or API call executed in the prior step. In embodiments, the query results comprise one or more financial products and associated data that is responsive to the natural language query. For example, in the case where the natural language query is "low cost emerging markets," the results may comprise a list of ETFs and MFs that satisfy the cost/emerging markets criteria. Each resulting ETF and MF may be accompanied by associated data, such as, for example, cost figures and which emerging market countries the ETF or MF invests in.

Once data retrieval module 224 retrieves the query results, those results are provided to ranking module 225. Method 1000 then proceeds to step 1075.

At step 1075, the received query results are ranked. In embodiments, step 1075 is carried out by ranking module 225. According to exemplary embodiments, ranking module 225 ranks the query results in accordance with ranking rules which are based on preferences identified in the natural language query, along with financial expertise that is expressed as metadata for the nodes 510 and associated tables in database 300. One exemplary technique of ranking query results is set forth in FIG. 11 below.

After ranking module 225 ranks the query results, ranking module 225 provides the ranked query results to communication module 221. Method 1000 then proceeds to step 1080.

At step 1080, in embodiments, communication module 221 transmits the ranked results to the user device 160 from which the natural language query was received at step 1005. In one or more embodiments, communication module 221 may format the ranked results in such a way to enable easy display of those results by user device 160. The ranking of results may be performed in accordance with the flow diagram depicted in FIG. 11. In exemplary embodiments, communication module 221 may transmit all or a subset of the ranked results to user device 160. For example, in exemplary embodiments, only results that meet a certain relevancy threshold may be transmitted to user device 160. In other exemplary embodiments, only the "best" result (i.e., the top ranked result) may be transmitted to user device 160.

In exemplary embodiments, pseudocode that implements a ranking algorithm carried out by ranking module 225 may be as follows:

```
<Pseudo Code>
// Start Ranking Algorithm
Set ORDERED_FACTORS = [Listing Country, Objective, Legal Structure, Vehicle, Sponsor,
Asset Type, Exposure, Attribute and Strategy]
DATA = received from SQL call for all nodes parsed in the query, this includes all possibilities of
investment products
Initialize relevance scores for all products (data rows) to zero.
// Loop over the 10 financial product factors in the ONTOLOGY by their order of significance.
For ONTOLOGY_FACTOR in ORDERED_FACTORS: do
    // Loop over the Nodes parsed in the query for each factor
    For NODE in ONTOLOGY_FACTOR: do
        If NODE is Financial Product Classification:
            Filter out irrelevant products from DATA that do not have same classification as NODE
            // Example: binary or categorical data, filter the products with classification=NODE
            // Example: For quantitative continuous data, select the products based on NODE data
distribution, like top 20 percentile
                Compute relevance score for NODE using Formula
                Add NODE relevance score to final product relevance scores
        If NODE is Financial Product Attribute:
            If preference is mentioned by user for NODE:
                Order NODE Data by preference so it can be used to compute NODE relevance
scores
            Else:
                Order NODE Data by default preference for NODE so it can be used to compute
NODE relevance scores
                Compute relevance score for NODE using Formula
                Add NODE relevance score to final product relevance scores
DATA is now left with all relevant financial products
Product relevance scores are received for all financial products
Sort the DATA by Product relevance scores in decreasing order (as higher the score, more relevant
the product)
Return the sorted DATA for display on UI
// End Ranking Algorithm
```

After step 1080, in embodiments, method 1000 ends.

Figure 11:
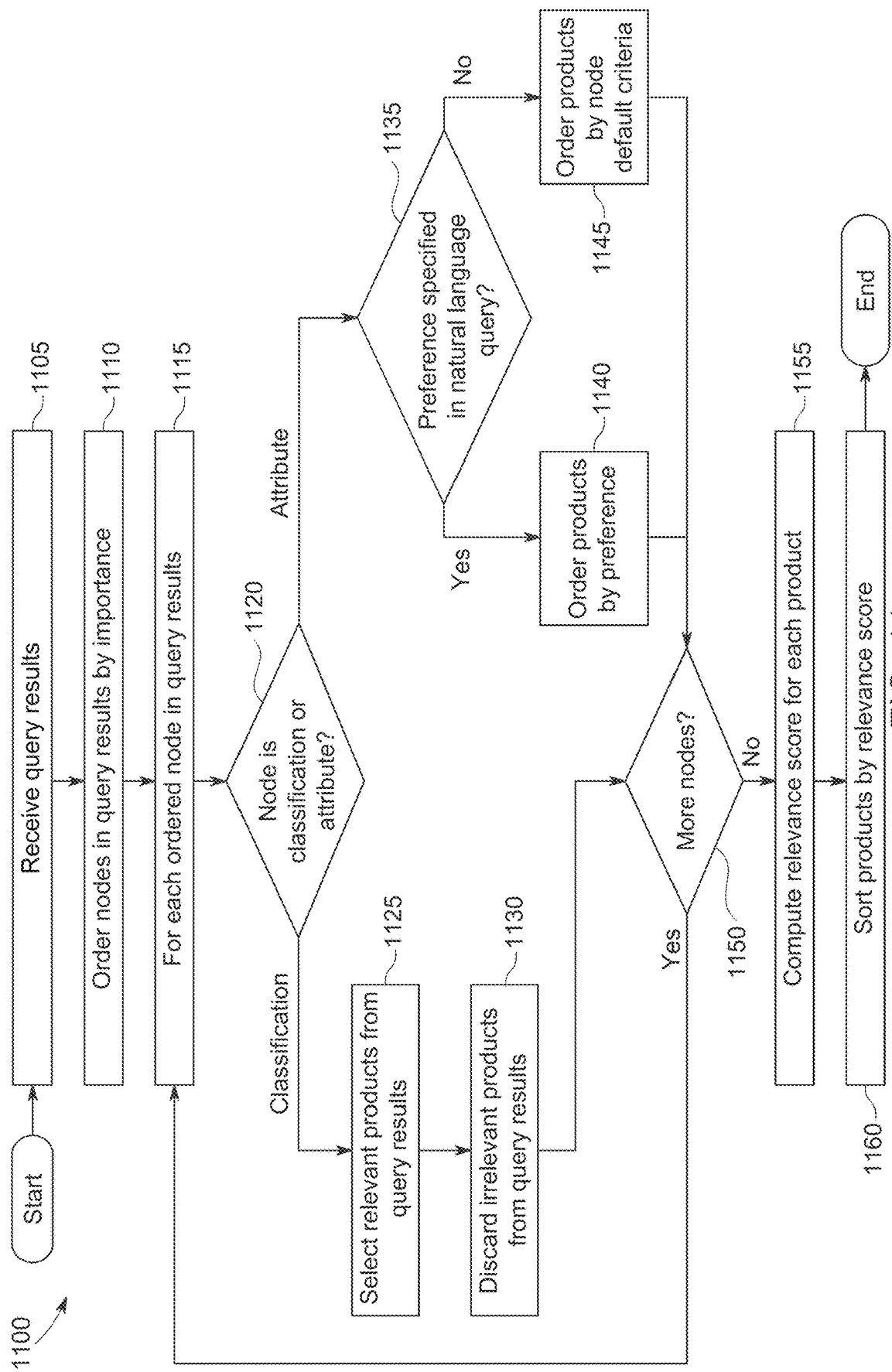
FIG. 11 is a flow diagram for ranking financial information obtained in response to a natural language query in accordance with exemplary embodiments of the present invention.

FIG. 11 is a flow diagram for a method 1100 for ranking financial information obtained in response to a natural language query in accordance with exemplary embodiments of the present invention. In accordance with exemplary embodiments, method 1100 is carried out by a computer system, such as computer system 110, which executes ranking module 225 or ontology system 220.

As shown in FIG. 11, method 1100 begins at step 1105, where ranking module 225 receives query results from data retrieval module 224, as described in connection with step 1070 of FIG. 10.

Next, at step 1110, ranking module 225 orders the nodes present in the query that produced the received results in a predetermined order of importance. In accordance with one or more embodiments, for the nodes 510 depicted in FIG. 8, the order of importance of those nodes is as follows: Listing Country, Objective, Legal Structure, Vehicle, Sponsor, Asset Type, Exposure, Preference, Attribute, and Strategy. Thus, if the underlying query that produced the received results included only tables for Sponsor, Vehicle, and Exposure, then the ordering performed by ranking module 225 would be as follows: Vehicle, Sponsor, and Exposure. In embodiments, the order of importance may vary.

After ranking module 225 orders the relevant nodes in order of importance, method 1100 proceeds to step 1115. At step 1115, ranking module 225 begins to execute a process for each node in the query in order of the node's importance. At step 1120, ranking module 225 determines whether a node/table in the query is a classification node or an attribute node. An example of a classification node would be Exposure/Region/Emerging Markets. An example, on the other hand, of an attribute node/table would be Attribute/Cost.

If ranking module 225 determines the node to be a classification node, then method 1100 proceeds to step 1125. If ranking module 225 determines the node to be an attribute node, then method 1100 proceeds to step 1135.

In the case where the node is a classification node, such as Exposure/Region/Emerging Markets, then, at step 1125, ranking module 225 analyzes the query results to select only those financial products in the results which can be classified as emerging markets products. Ranking module 225 may perform this selection based on predetermined criteria, such as, for example, a threshold percentage investment that the product must have in an emerging market country. Accordingly, at step 1130, ranking module 225 discards from the query results any financial products that fail to meet the predetermined criteria. After step 1130, method 1100 proceeds to step 1150.

In the case where the node is an attribute node, then method 1100 proceeds from step 1120 to step 1135. At step 1135, ranking module 225 determines whether a preference was specified in the natural language query. According to embodiments, parsing module 222 provides ranking module 225 with any preferences included with the natural language query, as discussed in connection with FIG. 9. For example, in the case where the natural language query is "low cost emerging markets," parsing module 222 may identify the adjective "low" as a preference that modifies the attribute cost. Accordingly, parsing module 222 provides ranking module 225 the term "low" as a preference for cost. In this scenario, ranking module 225 would determine that a preference was specified in the natural language query and method 1100 would proceed to step 1140.

At step 1140, ranking module 225 orders the financial product in the query results in accordance with the preference specified for the node being processed. For example, when the node being processed is Attribute (with the associated table Cost being the source of the query results), ranking module 225 orders the query results in accordance with the preference "low." That is, low cost financial products are ordered ahead of higher cost financial products.

If, however, no preference was specified in the natural language query, then ranking module 225 orders products in accordance with predetermined default criteria. According to embodiments, the default criteria can be determined based upon metadata associated with the node in question. For example, if the node/table in question is Attribute/Risk (where Risk represents the volatility of prices of the financial product), the default criteria for ordering may be from low risk to higher risk.

After step 1140 or 1145 are carried out, depending on whether a preference was specified in the natural language query, method 1100 proceeds to step 1150. At step 1150, ranking module 225 determines whether there are more nodes in the query that need to be processed. If there are, then method 1100 returns to step 1115. If there are no more nodes to process, then method 1100 proceeds to step 1155.

At step 1155, ranking module 255 computes a relevance score for each financial product remaining in the query results. According to embodiments, the relevance score is a weighted sum based, at least in part, upon the importance of the node from which the data was retrieved. Thus, financial products retrieved from node 510 (Listing Country) (which, in embodiments, is the most important node) would have a higher relevance score than financial products retrieved from a less important node, such as, for example node 510 (Vehicle), as shown in FIG. 8.

The relevance score is also computed based upon how strongly each financial product reflects a preference specified in the natural language query. For example, if a preference is specified in the natural language query for low cost financial products, then those products having the lowest cost would be given the highest relevance score. On the other hand, higher cost products would be assigned a lower relevance score.

Once a relevance score is determined for each financial product, method 1100 proceeds to step 1160. At step 1160, ranking module 225 sorts the financial products in descending order of relevance score. The sorted list of financial products, and any relevant data associated with those financial products, is then provided to communication module 221 for subsequent transmission to the user device 160 that initiated the natural language query.

After step 1160, method 1100 ends.

Figure 12:
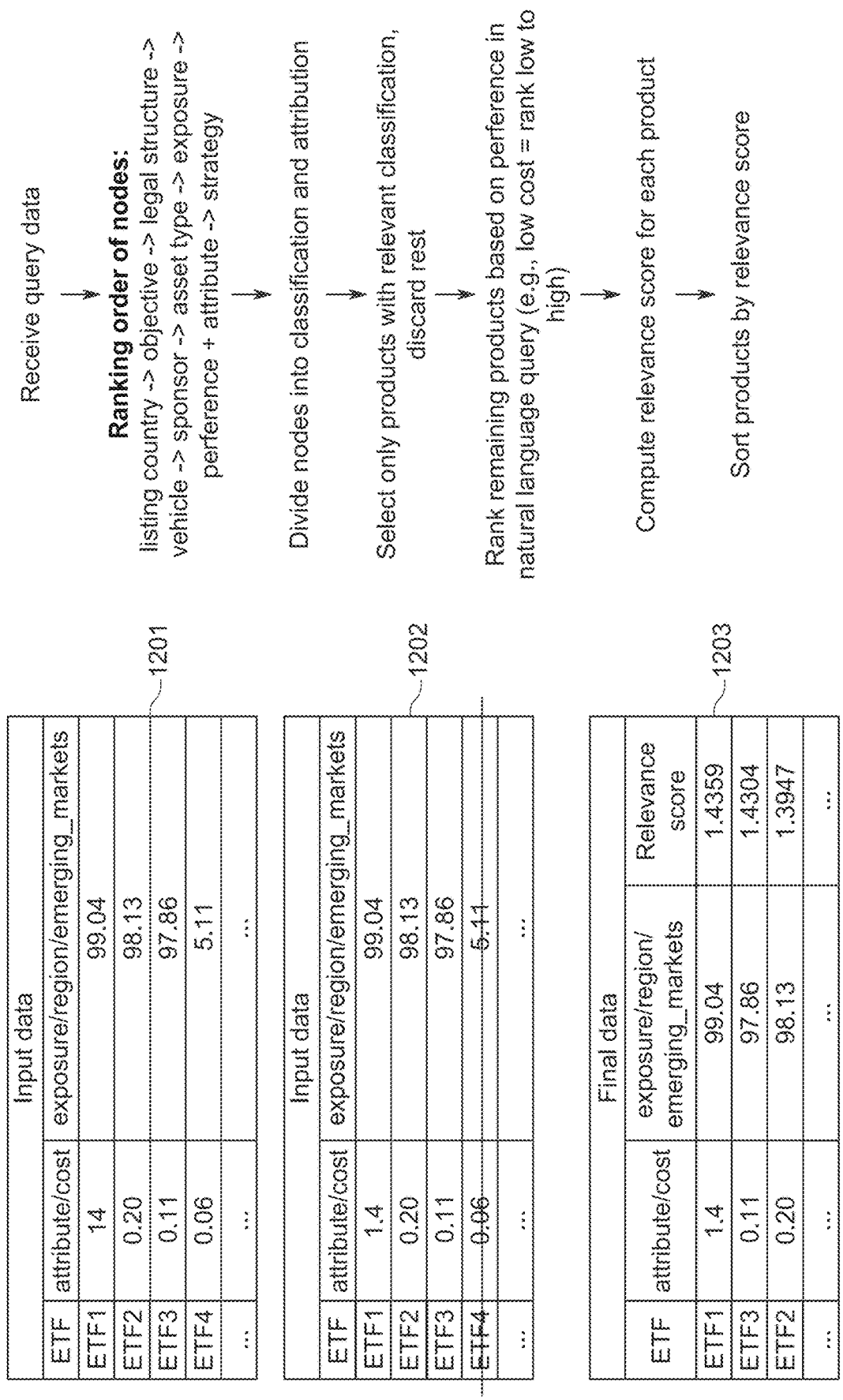
FIG. 12 is a block diagram that illustrates an example of ranking financial information in accordance with exemplary embodiments of the present invention.

FIG. 12 is a block diagram that illustrates an exemplary technique of ranking financial information in accordance with exemplary embodiments of the present invention. As with FIG. 11, the technique illustrated in FIG. 12 can be carried out, in embodiments, by ranking module 225 of ontology system 220.

As shown in FIG. 12, input data is received by ranking module 225, which represented by the first table 1201. As shown, table 1201 corresponds to query results in response to a natural language query "low cost emerging markets." The results in FIG. 12 identify four ETFs (ETF1, ETF2, ETF3, and ETF4) as being potentially responsive to the natural language query. The results were retrieved from the node/tables Attribute/Cost and Exposure/Region/Emerging Markets. Since Exposure ranks higher in importance than attribute, this node is processed first.

As FIG. 12 notes, Exposure/Region/Emerging Markets corresponds to a classification node. Thus, ranking module 225 determines which of the input data does not meet the classification corresponding emerging markets. As shown in table 1201, ETF1, ETF2, and ETF3 all have emerging market investment percentages in excess of 97 percent. ETF4, however, is only 5.11 percent invested in emerging markets. Therefore, ranking module 225 discards ETF4 from the query results, as shown by table 1202.

The node/table Attribute/Cost corresponds to an attribute node, rather than a classification node. Accordingly, the financial products are sorted by how strongly they reflect any preference in the natural language query. Thus, if the natural language query specifies an interest in "low cost" products, the query results will be sorted in a way that reflects a higher rank for low cost product and a lower rank for high cost products.

As shown in table 1203, a relevance score is computed for each financial product in the query results. In embodiments, a weighted sum is used for this computation according to the following formula: $R=\Sigma_i^n*\log[1+N(X_i)]$, where R is the relevance score for the financial product, n is the number nodes ranked, X is the current node being ranked, $N(X_i)$ is normalized data for node $X_i$, and $W_i$ is the weight for node $X_i$.

The relevance scores computed for ETF1, ETF2, and ETF3 are shown in table 1203. Although ETF1 has a significantly higher cost than ETF2 and ETF3, ETF1 has the highest relevance score due to its high emerging market investment percentage. As noted earlier, Exposure is a more important node than Attribute, and this difference in importance is reflected in the relevance scores. As shown in table 1203, ranking module 225 sorts the financial products in descending order of relevance scores.

Figure 13:
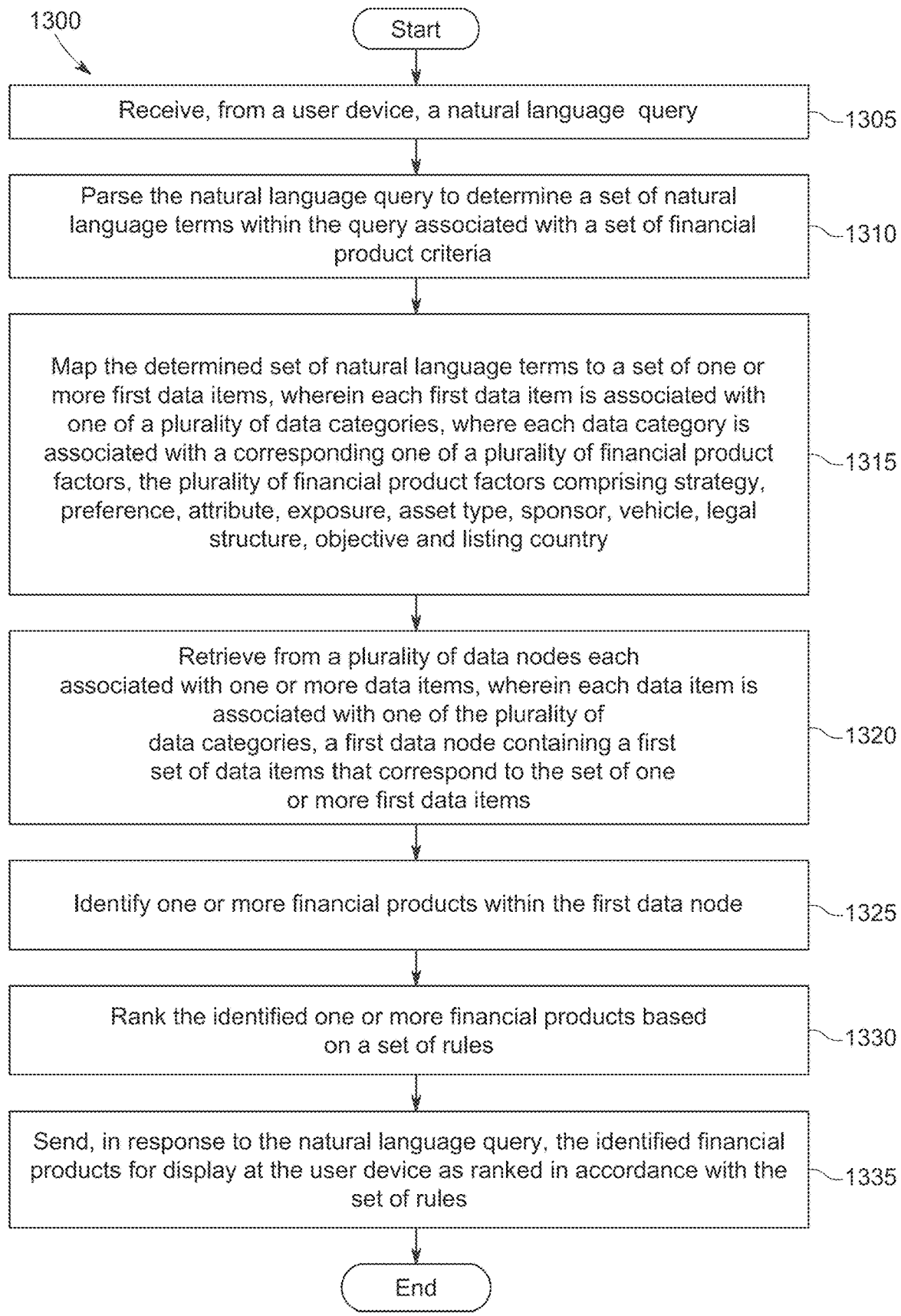
FIG. 13 is a flow diagram that illustrates a method for providing financial information responsive to a natural language query from a user device in accordance with exemplary embodiments of the present invention.

FIG. 13 is a flow diagram that illustrates a method 1300 for providing financial information responsive to a natural language query from a user device in accordance with exemplary embodiments of the present invention. According to embodiments, method 1300 is carried out by a computer system, such as, for example, computer system 110 depicted in FIG. 2.

Method 1300 begins at step 1305. At step 1305, the computer system receives, from a user device, a natural language query. At step 1310, the computer system parses the natural language query to determine a set of natural language terms within the query associate with a set of financial product criteria. At step 1315, the computer system maps the determined set of natural language terms to a set of one or more first data items, wherein each first data item is associated with one of a plurality of data categories, where each category is associated with a corresponding one of a plurality of financial product factors, the plurality of financial product factors comprising strategy, preference, attribute, exposure, asset type, sponsor, vehicle, legal structure, objective, and listing country. At step 1320, the computer system retrieves from a plurality of data nodes each associated with one or more data items, wherein each data item is associated with one of the plurality of data categories, a first data node containing a first set of data items that correspond to the set of one or more first data items. At step 1325, the computer system identifies one or more financial products within the first data node. At step 1330, the computer system ranks the identified one or more financial products based on a set of rules. At step 1335, the computer system sends, in response to the natural language query, the identified financial products for display at the user device as ranked in accordance with the set of rules.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method of processing a natural language query using a computer system that implements a multi-factor financial ontology framework comprising:

receiving, at a computer system comprising one or more computers, from a user device, a natural language query;

parsing, by the computer system, the natural language query to determine a set of natural language terms within the query associated with a set of financial product criteria;

accessing, by the computer system, one or more databases containing a multi-factor financial ontology framework comprising:

a plurality of data items, each data item associated with one of a plurality of data categories, each data category associated with a corresponding one of a plurality of financial product factors, the plurality of financial product factors comprising strategy, preference, attribute, exposure, asset type, sponsor, vehicle, legal structure, objective and listing country; and a plurality of data nodes, each of the plurality of data items having associated with it corresponding one or more data nodes of the plurality of data nodes;

mapping, by the computer system, the determined set of natural language terms to a set of one or more first data items;

identifying, by the computer system, one or more financial products that satisfy the set of financial product criteria, the step of identifying comprising:

targeting, by the computer system, the set of one or more first data items and one or more data nodes associated with the set of first data items as sources within the multi-factor financial ontology framework for retrieval of data associated with the response to the natural language query so that multiple interpretations of words are resolved based on context provided in the natural language query;

retrieving, by the computer system, from the plurality of first data nodes each associated with the one or more first data items, wherein each first data item is associated with one of the plurality of data categories, a first data node containing a first set of data items that correspond to the set of one or more first data items; and identifying, by the computer system, one or more financial products within the first data node;

ranking, by the computer system, the identified one or more financial products based on a set of rules; and sending, by the computer system, in response to the natural language query, the identified financial products for display at the user device as ranked in accordance with the set of rules.

2. The method of claim 1, wherein the parsing comprises:

assigning, by the computer system, each natural language term within the query a part of speech;

assigning, by the computer system, each natural language term within the query a relationship within a sentence that makes up the query; and assigning, by the computer system, each natural language term a financial context based on the financial product factors and the part of speech.

3. The method of claim 1, wherein the mapping comprises:
matching directly, by the computer system, each natural language term within the query to one of the plurality of data categories and one of the one or more first data items.

4. The method of claim 1, wherein the mapping comprises:
matching indirectly, by the computer system, each natural language term within the query to one of the plurality of data categories and one of the one or more first data items.

5. The method of claim 1, wherein the mapping comprises:
 a. determining, by the computer system, a synonym of a natural language term within the query; and
 b. matching, by the computer system, directly or indirectly the synonym to one of the plurality of data categories and one of the one or more first data items.

6. The method of claim 1, wherein the mapping comprises:
 a. identifying, by the computer system, a natural language term within the query that does not match with any of the one or more first data items; and
 b. establishing, by the computer system, a new data item associated with one of the plurality of data categories based on the identified natural language term.

7. The method of claim 1, wherein the identifying comprises:
deriving, by the computer system, a Structured Query Language (SQL) query to call the plurality of data nodes.

8. The method of claim 7, wherein the identifying further comprises:
 d. retrieving, by the computer system, from the plurality of data nodes a second data node containing a second set of data items that correspond to the set of one or more first data items, wherein the SQL query derived by the computer system joins the first data node with the second data node; and
 e. identifying, by the computer system, one or more financial products within the joined first and second data nodes.

9. The method of claim 1, wherein the identifying comprises:
making, by the computer system, an Application Programming Interface (API) call to read in the plurality of data nodes.

10. The method of claim 1, wherein the ranking is performed, by the computer system, based on one or more preferences identified in the natural language query.

11. The method of claim 1, wherein the ranking is performed, by the computer system, based on one or more data definitions each associated with one of the plurality of data nodes.

12. The method of claim 1, wherein the user device executes a web browser that communicates with the computer system over the internet.

13. The method of claim 1, wherein the sending comprises generating, by the computer system, a graphical user interface that displays the identified one or more financial products based on the set of rules.

14. The method of claim 1, wherein the user device is a mobile device.

15. The method of claim 1, wherein the natural language query is received from the internet.

16. The method of claim 1, wherein the natural language query is received from a software application configured to run on a mobile device.

17. The method of claim 1, wherein the natural language query is received at a Uniform Resource Locator (URL).

* * * * *